(12) United States Patent
Sikri et al.

(10) Patent No.: US 9,160,577 B2
(45) Date of Patent: Oct. 13, 2015

(54) HYBRID SAIC RECEIVER

(75) Inventors: Divaydeep Sikri, Woking (GB);
Farrokh Abrishamkar, San Diego, CA (US); Nico De Laurentiis, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 1411 days.

(21) Appl. No.: 12/433,200

(22) Filed: Apr. 30, 2009

(65) Prior Publication Data
US 2010/0278227 A1    Nov. 4, 2010

(51) Int. Cl.
*H03H 7/30* (2006.01)
*H04L 25/03* (2006.01)

(52) U.S. Cl.
CPC . *H04L 25/03292* (2013.01); *H04L 2025/03426* (2013.01)

(58) Field of Classification Search
USPC ......................................... 375/346, 229, 231
See application file for complete search history.

(56) References Cited

U.S. PATENT DOCUMENTS

| | | |
|---|---|---|
| 4,718,066 A | 1/1988 | Rogard |
| 4,885,744 A | 12/1989 | Lespagnol et al. |
| 5,172,118 A | 12/1992 | Peregrim et al. |
| 5,173,702 A | 12/1992 | Young et al. |
| 5,173,703 A | 12/1992 | Mangiapane et al. |
| 5,185,608 A | 2/1993 | Pozgay |
| 5,267,249 A | 11/1993 | Dong |
| 5,710,784 A | 1/1998 | Kindred et al. |
| 5,721,745 A | 2/1998 | Hladik et al. |
| 5,751,725 A | 5/1998 | Chen |
| 5,774,450 A | 6/1998 | Harada et al. |
| 5,774,496 A | 6/1998 | Butler et al. |
| 5,887,035 A | 3/1999 | Molnar |
| 5,960,361 A | 9/1999 | Chen |
| 5,983,383 A | 11/1999 | Wolf |

(Continued)

FOREIGN PATENT DOCUMENTS

| | | |
|---|---|---|
| CN | 1207835 A | 2/1999 |
| CN | 1250269 A | 4/2000 |

(Continued)

OTHER PUBLICATIONS

3GPP Draft; 25814-150, 3rd Generation Partnership Project (3GPP), Mobile Competence Centre ; 650, Route Des Lucioles ; F-06921 Sophia-Antipolis Cedex ; France, vol. RAN WG1, No. Shanghai, China; 20060526, May 26, 2006, XP050102001 pp. 29-30 p. 76 pp. 89-90.

(Continued)

*Primary Examiner* — Kevin Kim
(74) *Attorney, Agent, or Firm* — Ashish L. Patel

(57) ABSTRACT

Systems and methods of receiving data in a communication system are disclosed. The methods include equalizing a plurality of samples to suppress intersymbol interference and provide a first set of detected bits based on a first set of reference bits comprising a training sequence on a first iteration. The methods further include suppressing co-channel interference in the plurality of input samples and provide a set of suppressed samples based on a second set of reference bits comprising the first set of detected bits on a second iteration. The methods further include equalizing the set of suppressed samples to suppress intersymbol interference and provide a second set of detected bits based on the second set of reference bits on the second iteration.

22 Claims, 9 Drawing Sheets

(56) References Cited

U.S. PATENT DOCUMENTS

| | | |
|---|---|---|
| 6,108,373 A | 8/2000 | Fargues et al. |
| 6,169,759 B1 | 1/2001 | Kanterakis et al. |
| 6,208,699 B1 | 3/2001 | Chen et al. |
| 6,259,730 B1 | 7/2001 | Solondz |
| 6,282,233 B1 | 8/2001 | Yoshida |
| 6,285,682 B1 | 9/2001 | Proctor et al. |
| 6,396,867 B1 | 5/2002 | Tiedemann, Jr. et al. |
| 6,480,558 B1 | 11/2002 | Ottosson et al. |
| 6,496,706 B1 | 12/2002 | Jou et al. |
| 6,532,254 B1 | 3/2003 | Jokinen |
| 6,545,989 B1 | 4/2003 | Butler |
| 6,553,224 B1 | 4/2003 | Kim |
| 6,587,522 B1 | 7/2003 | Wheeler et al. |
| 6,590,881 B1 | 7/2003 | Wallace et al. |
| 6,615,030 B1 | 9/2003 | Saito et al. |
| 6,628,707 B2 | 9/2003 | Rafie et al. |
| 6,633,601 B1 | 10/2003 | Yang |
| 6,741,661 B2 | 5/2004 | Wheatley, III et al. |
| 6,744,814 B1 | 6/2004 | Blanksby et al. |
| 6,747,963 B1 | 6/2004 | Park et al. |
| 6,765,531 B2 | 7/2004 | Anderson |
| 6,765,894 B1 | 7/2004 | Hayashi |
| 6,771,689 B2 | 8/2004 | Solondz |
| 6,771,934 B2 | 8/2004 | Demers et al. |
| 6,834,197 B2 | 12/2004 | Nakahara et al. |
| 6,907,092 B1 | 6/2005 | Yakhnich et al. |
| 6,917,607 B1 | 7/2005 | Yeom et al. |
| 6,931,030 B1 | 8/2005 | Dogan |
| 6,934,264 B2 | 8/2005 | Jou |
| 6,956,893 B2 | 10/2005 | Frank et al. |
| 6,959,010 B1 | 10/2005 | Bahrenburg et al. |
| 6,975,604 B1 | 12/2005 | Ishida et al. |
| 6,977,888 B1 | 12/2005 | Frenger et al. |
| 6,983,166 B2 | 1/2006 | Shiu et al. |
| 6,985,516 B1 | 1/2006 | Easton et al. |
| 7,006,439 B2 | 2/2006 | Thron et al. |
| 7,006,795 B2 | 2/2006 | Foschini et al. |
| 7,013,147 B1 | 3/2006 | Kuwahara et al. |
| 7,023,880 B2 | 4/2006 | El-Maleh et al. |
| 7,031,742 B2 | 4/2006 | Chen et al. |
| 7,042,869 B1 | 5/2006 | Bender |
| 7,051,268 B1 | 5/2006 | Sindhushayana et al. |
| 7,107,031 B2 | 9/2006 | Kristensson et al. |
| 7,116,735 B2 | 10/2006 | Yamada et al. |
| 7,123,590 B2 | 10/2006 | Mir et al. |
| 7,130,365 B2 | 10/2006 | Li |
| 7,167,502 B1 | 1/2007 | Tsaur |
| 7,187,736 B2 | 3/2007 | Buckley et al. |
| 7,200,172 B2 | 4/2007 | Pukkila et al. |
| 7,224,962 B1 | 5/2007 | Kite |
| 7,295,636 B2 | 11/2007 | Onggosanusi et al. |
| 7,298,806 B1 | 11/2007 | Varma et al. |
| 7,302,009 B2 | 11/2007 | Walton et al. |
| 7,308,056 B2 | 12/2007 | Pukkila et al. |
| 7,313,189 B2 | 12/2007 | Yoshida et al. |
| 7,315,527 B2 | 1/2008 | Wei et al. |
| 7,349,379 B2 | 3/2008 | Schmidl et al. |
| 7,406,065 B2 | 7/2008 | Willenegger et al. |
| 7,466,666 B2 | 12/2008 | Yoon et al. |
| 7,613,144 B2 | 11/2009 | Malladi et al. |
| 7,620,662 B2 | 11/2009 | Kassai et al. |
| 7,630,321 B2 | 12/2009 | Jain et al. |
| 7,649,839 B2 | 1/2010 | Dendy |
| 7,650,116 B2 | 1/2010 | Haartsen |
| 7,693,210 B2 | 4/2010 | Margetts et al. |
| 7,706,430 B2 | 4/2010 | Guo et al. |
| 7,724,701 B2 | 5/2010 | Lundby et al. |
| 7,764,726 B2 | 7/2010 | Simic et al. |
| 7,881,711 B2 | 2/2011 | Lundby |
| 7,933,256 B2 | 4/2011 | Abrishamkar et al. |
| 8,077,637 B2 | 12/2011 | Fujimoto |
| 8,160,002 B2 | 4/2012 | Rajkotia et al. |
| 8,201,039 B2 | 6/2012 | Tiedemann, Jr. et al. |
| 8,259,848 B2 | 9/2012 | Malladi |
| 8,332,710 B2 | 12/2012 | Tsai et al. |
| 8,369,214 B2 | 2/2013 | Kim et al. |
| 8,396,440 B2 | 3/2013 | Canpolat et al. |
| 8,411,618 B2 | 4/2013 | Kim et al. |
| 8,422,955 B2 | 4/2013 | Smee et al. |
| 8,428,109 B2 | 4/2013 | Yang et al. |
| 8,442,441 B2 | 5/2013 | Pfister et al. |
| 8,489,128 B2 | 7/2013 | Lundby |
| 8,588,119 B2 | 11/2013 | Panta et al. |
| 8,594,252 B2 | 11/2013 | Black et al. |
| 8,611,305 B2 | 12/2013 | Black et al. |
| 8,630,602 B2 | 1/2014 | Attar et al. |
| 8,660,145 B2 | 2/2014 | Carmon et al. |
| 8,743,909 B2 | 6/2014 | Black et al. |
| 8,787,509 B2 | 7/2014 | Sikri et al. |
| 2001/0018650 A1 | 8/2001 | DeJaco |
| 2001/0021229 A1 | 9/2001 | Belaiche |
| 2002/0006138 A1 | 1/2002 | Odenwalder |
| 2002/0046379 A1 | 4/2002 | Miki et al. |
| 2002/0071407 A1 | 6/2002 | Koo et al. |
| 2002/0093937 A1 | 7/2002 | Kim et al. |
| 2002/0131381 A1 | 9/2002 | Kim et al. |
| 2002/0131532 A1 | 9/2002 | Chi et al. |
| 2002/0132625 A1 | 9/2002 | Ogino et al. |
| 2002/0181557 A1 | 12/2002 | Fujii |
| 2003/0004784 A1 | 1/2003 | Li et al. |
| 2003/0041206 A1 | 2/2003 | Dickie |
| 2003/0063596 A1 | 4/2003 | Arslan et al. |
| 2003/0078067 A1 | 4/2003 | Kim et al. |
| 2003/0103470 A1 | 6/2003 | Yafuso |
| 2003/0112370 A1 | 6/2003 | Long et al. |
| 2003/0119451 A1 | 6/2003 | Jang et al. |
| 2003/0125037 A1 | 7/2003 | Bae et al. |
| 2003/0134656 A1 | 7/2003 | Chang et al. |
| 2003/0147476 A1 | 8/2003 | Ma et al. |
| 2003/0199290 A1 | 10/2003 | Viertola |
| 2003/0212816 A1 | 11/2003 | Bender et al. |
| 2003/0223396 A1 | 12/2003 | Tsai et al. |
| 2004/0001563 A1 | 1/2004 | Scarpa |
| 2004/0005897 A1 | 1/2004 | Tomoe et al. |
| 2004/0017311 A1 | 1/2004 | Thomas et al. |
| 2004/0043746 A1 | 3/2004 | Hiramatsu |
| 2004/0062302 A1 | 4/2004 | Fujii et al. |
| 2004/0081124 A1 | 4/2004 | Black et al. |
| 2004/0081248 A1 | 4/2004 | Parolari |
| 2004/0082356 A1 | 4/2004 | Walton et al. |
| 2004/0085917 A1 | 5/2004 | Fitton et al. |
| 2004/0085936 A1 | 5/2004 | Gopalakrishnan et al. |
| 2004/0116122 A1 | 6/2004 | Zeira et al. |
| 2004/0131007 A1 | 7/2004 | Smee et al. |
| 2004/0141525 A1 | 7/2004 | Bhushan et al. |
| 2004/0157614 A1 | 8/2004 | Fujita et al. |
| 2004/0160933 A1 | 8/2004 | Odenwalder et al. |
| 2004/0168113 A1 | 8/2004 | Murata et al. |
| 2004/0185868 A1 | 9/2004 | Jain et al. |
| 2004/0198404 A1 | 10/2004 | Attar et al. |
| 2004/0203913 A1 | 10/2004 | Ogino et al. |
| 2004/0223507 A1 | 11/2004 | Kuchibhotla et al. |
| 2004/0223538 A1 | 11/2004 | Zeira |
| 2004/0229615 A1 | 11/2004 | Agrawal |
| 2004/0240400 A1 | 12/2004 | Khan |
| 2004/0240416 A1 | 12/2004 | Derryberry et al. |
| 2005/0013263 A1 | 1/2005 | Kim et al. |
| 2005/0018614 A1 | 1/2005 | Kiran |
| 2005/0037718 A1 | 2/2005 | Kim et al. |
| 2005/0037775 A1 | 2/2005 | Moeglein et al. |
| 2005/0053088 A1 | 3/2005 | Cheng et al. |
| 2005/0058154 A1 | 3/2005 | Lee et al. |
| 2005/0084045 A1 | 4/2005 | Stewart et al. |
| 2005/0111408 A1 | 5/2005 | Skillermark et al. |
| 2005/0147024 A1 | 7/2005 | Jung et al. |
| 2005/0153695 A1 | 7/2005 | Cho |
| 2005/0185364 A1 | 8/2005 | Bell et al. |
| 2005/0195889 A1 | 9/2005 | Grant et al. |
| 2005/0213505 A1 | 9/2005 | Iochi et al. |
| 2005/0220042 A1 | 10/2005 | Chang et al. |
| 2005/0232174 A1 | 10/2005 | Onggosanusi et al. |
| 2005/0249163 A1 | 11/2005 | Kim et al. |
| 2005/0265399 A1 | 12/2005 | El-Maleh et al. |
| 2005/0265465 A1 | 12/2005 | Hosur et al. |

(56) References Cited

U.S. PATENT DOCUMENTS

| | | |
|---|---|---|
| 2005/0277429 A1 | 12/2005 | Laroia et al. |
| 2006/0003792 A1 | 1/2006 | Gholmieh et al. |
| 2006/0050666 A1 | 3/2006 | Odenwalder |
| 2006/0109938 A1* | 5/2006 | Challa et al. ............ 375/347 |
| 2006/0126491 A1 | 6/2006 | Ro et al. |
| 2006/0126765 A1 | 6/2006 | Shin et al. |
| 2006/0126844 A1 | 6/2006 | Mauro |
| 2006/0141935 A1 | 6/2006 | Hou et al. |
| 2006/0142038 A1 | 6/2006 | Ozarow et al. |
| 2006/0146953 A1 | 7/2006 | Raghothaman et al. |
| 2006/0146969 A1 | 7/2006 | Zhang et al. |
| 2006/0203943 A1 | 9/2006 | Scheim et al. |
| 2006/0209783 A1 | 9/2006 | Jain et al. |
| 2006/0209902 A1 | 9/2006 | Grilli et al. |
| 2006/0209982 A1 | 9/2006 | De Gaudenzi et al. |
| 2006/0227853 A1 | 10/2006 | Liang et al. |
| 2006/0234715 A1 | 10/2006 | Cho et al. |
| 2007/0021148 A1 | 1/2007 | Mahini |
| 2007/0040704 A1 | 2/2007 | Smee et al. |
| 2007/0050189 A1 | 3/2007 | Cruz-Zeno et al. |
| 2007/0058709 A1 | 3/2007 | Chen et al. |
| 2007/0058746 A1 | 3/2007 | Gueguen |
| 2007/0063897 A1 | 3/2007 | Matsuda |
| 2007/0071145 A1 | 3/2007 | Perets |
| 2007/0076707 A1 | 4/2007 | Link et al. |
| 2007/0086513 A1 | 4/2007 | Fernandez-Corbaton et al. |
| 2007/0110095 A1 | 5/2007 | Attar et al. |
| 2007/0112564 A1 | 5/2007 | Jelinek |
| 2007/0121554 A1 | 5/2007 | Luo et al. |
| 2007/0121764 A1 | 5/2007 | Chen et al. |
| 2007/0127608 A1 | 6/2007 | Scheim et al. |
| 2007/0133423 A1 | 6/2007 | Okumura |
| 2007/0133475 A1 | 6/2007 | Peisa et al. |
| 2007/0150787 A1 | 6/2007 | Kim et al. |
| 2007/0150788 A1 | 6/2007 | Zhuyan |
| 2007/0183483 A1 | 8/2007 | Narayan et al. |
| 2007/0201548 A1 | 8/2007 | Badri-Hoeher et al. |
| 2007/0273698 A1 | 11/2007 | Du et al. |
| 2008/0019308 A1 | 1/2008 | Chuan-Lin et al. |
| 2008/0019467 A1 | 1/2008 | He |
| 2008/0031368 A1 | 2/2008 | Lindoff et al. |
| 2008/0057963 A1 | 3/2008 | Kayama et al. |
| 2008/0076432 A1 | 3/2008 | Senarath et al. |
| 2008/0080363 A1 | 4/2008 | Black et al. |
| 2008/0080406 A1 | 4/2008 | Peplinski et al. |
| 2008/0101440 A1 | 5/2008 | Lee |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2008/0305790 A1 | 12/2008 | Wakabayashi |
| 2009/0022098 A1 | 1/2009 | Novak et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0109907 A1 | 4/2009 | Tsai et al. |
| 2009/0207944 A1 | 8/2009 | Furman et al. |
| 2009/0213971 A1 | 8/2009 | Park et al. |
| 2009/0303968 A1 | 12/2009 | Jou et al. |
| 2009/0303976 A1 | 12/2009 | Jou et al. |
| 2009/0304024 A1 | 12/2009 | Jou et al. |
| 2010/0027702 A1 | 2/2010 | Vijayan et al. |
| 2010/0029213 A1 | 2/2010 | Wang |
| 2010/0029262 A1 | 2/2010 | Wang et al. |
| 2010/0040035 A1 | 2/2010 | Shapiro et al. |
| 2010/0046595 A1 | 2/2010 | Sikri et al. |
| 2010/0046660 A1 | 2/2010 | Sikri et al. |
| 2010/0046682 A1 | 2/2010 | Sikri et al. |
| 2010/0054212 A1 | 3/2010 | Tang |
| 2010/0097955 A1 | 4/2010 | Jou |
| 2010/0172383 A1 | 7/2010 | Montalvo et al. |
| 2010/0202544 A1 | 8/2010 | Osseirar et al. |
| 2010/0248666 A1 | 9/2010 | Hui et al. |
| 2010/0296556 A1 | 11/2010 | Rave et al. |
| 2010/0310026 A1 | 12/2010 | Sikri et al. |
| 2011/0051859 A1 | 3/2011 | Canpolat et al. |
| 2011/0051864 A1 | 3/2011 | Chalia et al. |
| 2011/0264976 A1 | 10/2011 | Yang et al. |
| 2011/0305303 A1 | 12/2011 | Sikri et al. |
| 2012/0243515 A1 | 9/2012 | Xue et al. |
| 2012/0281675 A1 | 11/2012 | Liang et al. |
| 2014/0187248 A1 | 7/2014 | Black et al. |

FOREIGN PATENT DOCUMENTS

| | | |
|---|---|---|
| CN | 1278382 A | 12/2000 |
| CN | 1304589 A | 7/2001 |
| CN | 1311612 A | 9/2001 |
| CN | 1315095 A | 9/2001 |
| CN | 1394407 A | 1/2003 |
| CN | 1447549 A | 10/2003 |
| CN | 1497857 A | 5/2004 |
| CN | 1552133 A | 12/2004 |
| CN | 1736101 A | 2/2006 |
| CN | 1742457 A | 3/2006 |
| CN | 1758563 A | 4/2006 |
| CN | 1893406 A | 1/2007 |
| CN | 1906862 A | 1/2007 |
| CN | 1983913 A | 6/2007 |
| CN | 101189901 A | 5/2008 |
| CN | 101366305 A | 2/2009 |
| CN | 101465689 A | 6/2009 |
| CN | 101483499 A | 7/2009 |
| EP | 0396403 A1 | 11/1990 |
| EP | 0949766 A2 | 10/1999 |
| EP | 0969608 A2 | 1/2000 |
| EP | 1168703 A2 | 1/2002 |
| EP | 1199833 A2 | 4/2002 |
| EP | 1347611 A1 | 9/2003 |
| EP | 1398984 A1 | 3/2004 |
| EP | 1404047 A2 | 3/2004 |
| EP | 1411693 A2 | 4/2004 |
| EP | 1422900 A1 | 5/2004 |
| EP | 1478117 A2 | 11/2004 |
| EP | 1569399 A1 | 8/2005 |
| EP | 1643737 A1 | 4/2006 |
| EP | 1677433 A1 | 7/2006 |
| EP | 1681775 A2 | 7/2006 |
| EP | 1699194 A1 | 9/2006 |
| EP | 1699195 A1 | 9/2006 |
| EP | 1701565 A1 | 9/2006 |
| EP | 1703659 A2 | 9/2006 |
| EP | 1821497 A1 | 8/2007 |
| EP | 1928138 A2 | 6/2008 |
| GB | 2337417 | 11/1999 |
| JP | 62239735 A | 10/1987 |
| JP | 10500811 | 1/1998 |
| JP | H10327126 A | 12/1998 |
| JP | 2000059290 A | 2/2000 |
| JP | 2000261397 A | 9/2000 |
| JP | 2001036964 A | 2/2001 |
| JP | 2001078252 | 3/2001 |
| JP | 2001166026 A | 6/2001 |
| JP | 2001512916 A | 8/2001 |
| JP | 3210915 B2 | 9/2001 |
| JP | 2001257626 A | 9/2001 |
| JP | 2001267987 A | 9/2001 |
| JP | 2001519113 | 10/2001 |
| JP | 2002009741 A | 1/2002 |
| JP | 2002506583 | 2/2002 |
| JP | 2002507342 A | 3/2002 |
| JP | 2002508129 A | 3/2002 |
| JP | 2002532008 T | 9/2002 |
| JP | 2002539711 A | 11/2002 |
| JP | 2002353824 | 12/2002 |
| JP | 2003051762 A | 2/2003 |
| JP | 2003152603 A | 5/2003 |
| JP | 2003194916 A | 7/2003 |
| JP | 2003244103 A | 8/2003 |
| JP | 2003338779 A | 11/2003 |
| JP | 2004048307 A | 2/2004 |
| JP | 2004112094 A | 4/2004 |

(56) References Cited

FOREIGN PATENT DOCUMENTS

| | | |
|---|---|---|
| JP | 2004511189 A | 4/2004 |
| JP | 2004512733 A | 4/2004 |
| JP | 2004159277 A | 6/2004 |
| JP | 2004166218 A | 6/2004 |
| JP | 2004194288 A | 7/2004 |
| JP | 2004531975 A | 10/2004 |
| JP | 2004343754 A | 12/2004 |
| JP | 2005065197 A | 3/2005 |
| JP | 2005510940 A | 4/2005 |
| JP | 2006503485 A | 1/2006 |
| JP | 2006180266 A | 7/2006 |
| JP | 2006191582 A | 7/2006 |
| JP | 2006191587 A | 7/2006 |
| JP | 2006314086 A | 11/2006 |
| JP | 2007503169 A | 2/2007 |
| JP | 2007195247 A | 8/2007 |
| JP | 2007524269 A | 8/2007 |
| JP | 2008053889 A | 3/2008 |
| JP | 2008199493 A | 8/2008 |
| JP | 2008278338 A | 11/2008 |
| JP | 2008539664 A | 11/2008 |
| JP | 2009545219 A | 12/2009 |
| JP | 2011521373 A | 7/2011 |
| JP | 2011524115 A | 8/2011 |
| KR | 20010031665 | 4/2001 |
| KR | 20010085143 A | 9/2001 |
| KR | 20020092136 | 12/2002 |
| KR | 20030059528 A | 7/2003 |
| KR | 20040097893 A | 11/2004 |
| KR | 20050073113 A | 7/2005 |
| KR | 1020050097552 A | 10/2005 |
| KR | 20070091214 A | 9/2007 |
| KR | 20070104633 A | 10/2007 |
| KR | 20080039772 A | 5/2008 |
| RU | 2211531 C2 | 8/2003 |
| RU | 2233343 C2 | 7/2004 |
| RU | 2233045 C2 | 7/2004 |
| RU | 2280329 C1 | 7/2006 |
| RU | 2301493 | 6/2007 |
| RU | 2319307 C2 | 3/2008 |
| RU | 2323529 C2 | 4/2008 |
| TW | 365717 | 8/1999 |
| TW | 200640202 | 11/2006 |
| TW | 200704232 | 1/2007 |
| TW | 201008148 A | 2/2010 |
| WO | 9526593 | 10/1995 |
| WO | 98018212 | 4/1998 |
| WO | 9832231 A1 | 7/1998 |
| WO | 9857452 A1 | 12/1998 |
| WO | 9857509 A2 | 12/1998 |
| WO | 9901950 A2 | 1/1999 |
| WO | 9912273 | 3/1999 |
| WO | 9923844 A2 | 5/1999 |
| WO | 99029048 | 6/1999 |
| WO | 0033528 A1 | 6/2000 |
| WO | 00035117 | 6/2000 |
| WO | 0035126 A1 | 6/2000 |
| WO | WO0055992 A1 | 9/2000 |
| WO | 0062456 A1 | 10/2000 |
| WO | 0070786 A1 | 11/2000 |
| WO | 01008324 | 2/2001 |
| WO | 01017158 | 3/2001 |
| WO | 0223792 A1 | 3/2002 |
| WO | 0233877 A1 | 4/2002 |
| WO | 02030004 | 4/2002 |
| WO | WO0232003 A1 | 4/2002 |
| WO | WO020674 A1 | 8/2002 |
| WO | 02103920 A2 | 12/2002 |
| WO | 03001834 A1 | 1/2003 |
| WO | 03017527 | 2/2003 |
| WO | 03021905 A1 | 3/2003 |
| WO | WO03047124 A1 | 6/2003 |
| WO | 03067783 | 8/2003 |
| WO | 03079577 A2 | 9/2003 |
| WO | 03096635 A1 | 11/2003 |
| WO | 03105370 A1 | 12/2003 |
| WO | 2004010573 A1 | 1/2004 |
| WO | 2004015909 A1 | 2/2004 |
| WO | 2004025869 A2 | 3/2004 |
| WO | 2004025986 A2 | 3/2004 |
| WO | 2004032369 A2 | 4/2004 |
| WO | WO2004066666 | 8/2004 |
| WO | 2004084480 A1 | 9/2004 |
| WO | 2004102864 A1 | 11/2004 |
| WO | 2004107768 A2 | 12/2004 |
| WO | 2004114582 A1 | 12/2004 |
| WO | 2005020464 A1 | 3/2005 |
| WO | 2005034383 A2 | 4/2005 |
| WO | 2005036913 A1 | 4/2005 |
| WO | 2005053177 A1 | 6/2005 |
| WO | 2005060192 A1 | 6/2005 |
| WO | 2006004948 | 1/2006 |
| WO | 2006071761 | 7/2006 |
| WO | 2006115979 A1 | 11/2006 |
| WO | WO2007000620 A1 | 1/2007 |
| WO | 2007016553 A1 | 2/2007 |
| WO | 2007024963 | 3/2007 |
| WO | WO2007029958 A1 | 3/2007 |
| WO | 2007053840 | 5/2007 |
| WO | WO2007060093 A1 | 5/2007 |
| WO | WO2007060229 A1 | 5/2007 |
| WO | 2008005890 | 1/2008 |
| WO | WO2008012265 A1 | 1/2008 |
| WO | 2008027192 A2 | 3/2008 |
| WO | 2008156061 A1 | 12/2008 |
| WO | 2009105611 A1 | 8/2009 |
| WO | WO2009108586 A2 | 9/2009 |
| WO | 2009137464 A2 | 11/2009 |
| WO | WO2009140338 A2 | 11/2009 |
| WO | 2009152138 A2 | 12/2009 |
| WO | 2010014968 A1 | 2/2010 |
| WO | 2011028978 | 3/2011 |

OTHER PUBLICATIONS

Huaiyu, D. et al., "Asymptotic spectral efficiency of multi cell MIMO systems with frequency-flat fading," IEEE Transactions on Signal Processing, IEEE Service Center, New York, NY, US, vol. 51, No. 11, Nov. 1, 2003, pp. 2976-2988, XP011102811.
International Search Report—PCT/US2010/032858—International Search Authority, European Patent Office, Dec. 15, 2010.
Meyr, H. et al., "Chapter 5: Synthesis of Synchronization Algorithms" and "Chapter 8: Frequency Estimation," Jan. 1, 1998, Digital Communication Receivers:Synchronization,Channel Estimation, and Signal Processing; John Wiley and Sons, Inc.: New York, pp. 271-323,445, XP002547568.
Pais, A.V., et al., "Indoor DS-CDMA system deployment and performance with successive interference cancellation," Electronics Letters: GB, vol. 40, No. 19, Sep. 16, 2004, pp. 1200-1201, XP006022654.
Ritt: "Performance of IDMA-based inter-cell interference cancellation," 3GPP Draft TSG-RAN WG1 #44-bis Meeting, R1-060895, 3rd Generation Partnership Project (3GPP), Athens, Greece; Mar. 27, 2006, XP050101801, pp. 1-5.
Written Opinion—PCT/US2010/032858—ISA/EPO—Dec. 15, 2010.
Natali F D: "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.
Olivier J.C., et al., "Single antenna interference cancellation for synchronised GSM networks using a widely linear receiver" (Feb. 1, 2007) pp. 131-136, XP006028092.
Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.
Taiwan Search Report—TW099113967—TIPO—Jan. 8, 2013.
Chunguang, W., et al., "Enhanced OTDOA Technology in 3G Location Service", Shanghai Research Institute of China Telecom, Shanghai 200122, China, Aug. 31, 2005.

(56) References Cited

OTHER PUBLICATIONS

Xiaofa, L., "The study of Interference Cancellation based on Multi-User Detection", Chinese Scientific Papers Online, pp. 7, Mar. 27, 2008.

Divsalar, D., et al., "Improved parallel interference cancellation for CDMA", Communications, IEEE Transactions on, Feb. 1998, Volume: 46, Issue: 2, pp. 258-268.

3rd Generation Partnership, Project 2 "3GPP2" Physical Layer Standard for cdma2000, Spread Spectrum Systems. Revision D, 3GPP2 C.50002-D, Version 2.0, 30 Sep. 2005 (538 pages).

Chen, B.Y., et al., "Using H.264 Coded Block Patterns for Fast Inter-Mode Selection" Multimedia and Expo, 2008 IEEE International Conference on, IEEE, Piscataway, NJ, USA, Jun. 23, 2008, pp. 721-724, XP031312823 ISBN: 978-1-4244-2570-9.

JVT: "Draft ITU-T Recommendation and Final Draft International Standard of Joint Video Specification (ITU-T Rec.H .264 ISO/IEC 14496-10 AVC)", 7. JVT Meeting; 64. MPEG Meeting; 07-03-2003-14-13-2003; Pattaya,TH; (Joint Video Team of ISO/IEC JTC1/SC29/WG11 and ITU-T 56.16 ), No. JVT-G050r1, Mar. 14, 2003, XP030005712, ISSN: 0000-0427.

Lakkavalli, S., et al., "Stretchable Architectures for Next Generation Cellular Networks", ISART'03, Mar. 4, 2003, 7 pages.

NTT DoCoMo: "Text proposals for detailed channel coding," 3GPP TSG-RAN WG1 #7, R1-99b49, Aug. 1999, pp. 24.

"Soft Handoff and Power Control in IS-95 CDMA", CDMA95.10, Dec. 6, 1999, pp. 181-212.

Tseng, S-M., et al., Fuzzy adaptive parallel interference cancellation and vector channel prediction for CDMA in fading channels, Communications, 2002. Icc 2002. IEEE International Conference on, 2002, vol. 1, pp. 252-256.

Qualcomm Europe: "On E-DCH structure", 3GPP Draft, R1-040538, 3RD Generation Partnership Project (3GPP), Mobile Competence Centre, 650, Route Des Lucioles, F-06921 Sophia-Antipolis Cedex, France, vol. RAN WG1, no. Montreal, Canada, May 6, 2004, XP050098746, [retrieved on May 6, 2004] Section 3.

Qualcomm Incorporated: "Introducing Enhancements to CS voice over DCH," 3GPP Draft; R1-123809 (3GPP),Mobile Competence Centre; 650, Route Des Lucioles; F-06921 Sophia-Antipolis Cedex; FR, vol. RAN WG1, no. Qingdao, China; Aug. 13, 2012-Aug. 17, 2012, Aug. 5, 2012. XP050661662.

Wu Q ., et al., "The cdma2000 High Rate Packet Data System", Internet Citation, Mar. 26, 2002, XP002303829, Retrieved from the Internet: URL: http://www.qualcomm.com/technology/1xe v-do/publishedpapers/cdma2000 HighRatePacket.pdf [retrieved on Nov. 3, 2004] Sections 3.1.7 and 3.2.

Philips, "Mapping of Transport Channels to Physical Channels [online]," 3GPP TSG-RAN WG2#51 R2-060424, <URL: http://www.3gpp.org/ftp/tsg_ran/WG2_RL2/TSGR2_51/Documents/R2-060424.zip>, Feb. 2006.

* cited by examiner

HYBRID SAIC RECEIVER

BACKGROUND

1. Field

The present invention relates to wireless communication and, in particular, relates to antenna interference cancellation.

2. Background

In a communication system, a transmitter processes data to generate a modulated signal and transmits the modulated signal on a frequency band/channel and via a communication channel to a receiver. The transmitted signal is distorted by the communication channel, corrupted by noise, and further degraded by co-channel interference, which is interference from other transmitters transmitting on the same frequency band/channel. The receiver receives the transmitted signal, processes the received signal, and attempts to recover the data sent by the transmitter. The distortion due to the communication channel, the noise, and the co-channel interference all hinder the receiver's ability to recover the transmitted data.

There is therefore a need in the art for a receiver that can effectively deal with co-channel interference and channel distortion.

SUMMARY

A receiver comprising a hybrid demodulator that can be configured as an interference suppression (IS) demodulator on a first iteration and as a SAIC demodulator on a subsequent iteration is disclosed. This hybrid configuration can be utilized when a measured signal level associated with a received signal is below a threshold level.

According to one aspect of the subject technology, a receiver in a wireless communication system comprises an interference suppressor configured to suppress co-channel interference. The receiver can further comprise an equalizer configured to suppress intersymbol interference. The receiver can further comprise a controller configured to: a) control the equalizer to suppress intersymbol interference in a plurality of input samples of a received signal and provide a first set of detected bits based on a first set of reference bits comprising a training sequence on a first iteration; b) control the interference suppressor to suppress co-channel interference in the plurality of input samples and provide a set of suppressed samples based on a second set of reference bits comprising the first set of detected bits on a second iteration; and c) control the equalizer to suppress intersymbol interference in the set of suppressed samples of b) and provide a second set of detected bits based on the second set of reference bits on the second iteration.

According to another aspect of the subject technology, a method for processing input samples of a signal received in a wireless communication system comprises: a) equalizing a plurality of input samples to suppress intersymbol interference and provide a first set of detected bits based on a first set of reference bits comprising a training sequence on a first iteration; b) suppressing co-channel interference in the plurality of input samples and provide a set of suppressed samples based on a second set of reference bits comprising the first set of detected bits on a second iteration; and c) equalizing the set of suppressed samples of the step b) to suppress intersymbol interference and provide a second set of detected bits based on the second set of reference bits on the second iteration.

According to yet another aspect of the subject technology, a receiver comprises first interference suppressing means for suppressing co-channel interference. The receiver can further comprise second interference suppressing means for suppressing intersymbol interference. The receiver can further comprise controlling means for: a) controlling the second interference suppressing means to suppress intersymbol interference in a plurality of input samples of a received signal and provide a first set of detected bits based on a first set of reference bits comprising a training sequence on a first iteration; b) controlling the first interference suppressing means to suppress co-channel interference in the plurality of input samples and provide a set of suppressed samples based on a second set of reference bits comprising the first set of detected bits on a second iteration; and c) controlling the second interference suppressing means to suppress intersymbol interference in the set of suppressed samples of b) and provide a second set of detected bits based on the second set of reference bits on the second iteration.

According to yet another aspect of the subject technology, a machine-readable medium comprises instructions for processing input samples of a signal received in a wireless communication system. The instructions comprise code for: a) controlling the second interference suppressing means to suppress intersymbol interference in a plurality of input samples of a received signal and provide a first set of detected bits based on a first set of reference bits comprising a training sequence on a first iteration; b) controlling the first interference suppressing means to suppress co-channel interference in the plurality of input samples and provide a set of suppressed samples based on a second set of reference bits comprising the first set of detected bits on a second iteration; and c) controlling the second interference suppressing means to suppress intersymbol interference in the set of suppressed samples of b) and provide a second set of detected bits based on the second set of reference bits on the second iteration.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
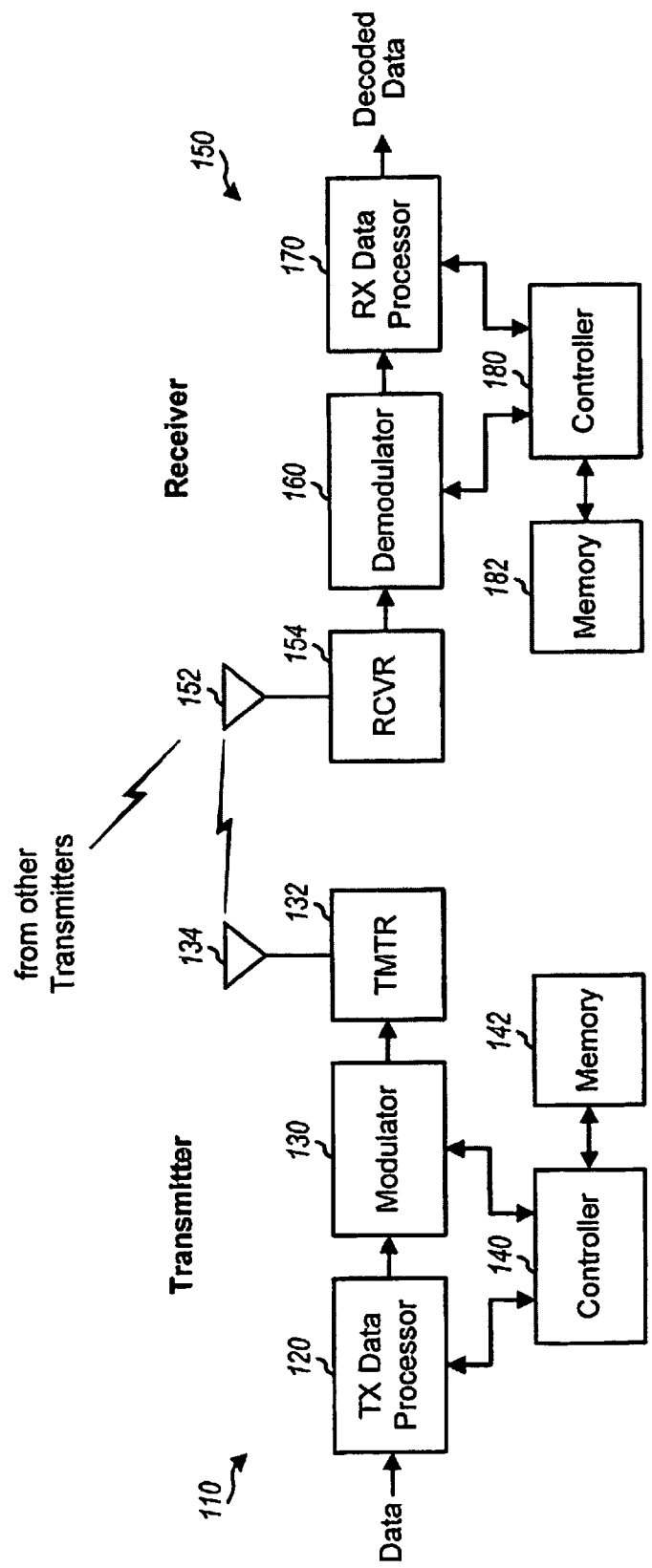
FIG. 1 is a block diagram of a transmitter and a receiver in a wireless communication system.

A receiver comprising a hybrid demodulator that can be configured as an IS demodulator on a first iteration and as a SAIC demodulator on a subsequent iteration is disclosed. For clarity, various aspects of a receiver are specifically described below for Global System for Mobile Communications (GSM) technology. FIG. 1 shows a block diagram of a transmitter 110 and a receiver 150 in a wireless communication system. The transmitter 110 may be a base station or a wireless device, and the receiver 150 may also be a wireless device or a base station. At the transmitter 110, a transmit (TX) data processor 120 receives, formats, encodes, and interleaves data based on a coding and interleaving scheme and provides a stream of input bits to a modulator 130. For GSM, the modulator 130 performs GMSK modulation on the input bits and provides a GMSK modulated signal (or simply, a GMSK signal). GMSK is a continuous phase modulation scheme used in GSM and is described below. A transmitter unit (TMTR) 132 conditions (e.g., filters and amplifies) the GMSK signal and generates a radio frequency (RF) modulated signal, which is transmitted via an antenna 134 to receiver 150.

In one aspect, to generate a GMSK signal, the modulator 130 receives input bits a from the TX data processor 120 and performs differential encoding on the inputs bits to generate code symbols c. On new code symbol is generated for each new input bit. Each input bit and each code symbol have a real value either +1 or −1. The modulator 130 further filters each code symbol with a Gaussian lowpass filter to generate a frequency pulse having a duration of approximately four sample periods (4T). The modulator 130 integrates the frequency pulses for the code symbols to generate a modulating signal and further modulates a carrier signal with the modulating signal to generate the GMSK signal.

At the receiver 150, an antenna 152 receives the RF modulated signal from the transmitter 110 and RF modulated signals from other transmitters in the GSM system. The antenna 152 provides a received GMSK signal to a receiver unit (RCVR) 154. The receiver unit 154 conditions and digitizes the received GMSK signal and provides received samples. A demodulator 160 processes the received samples and provides detected bits, as described below. An RX data processor 170 processes (e.g., deinterleaves and decodes) the detected bits and recovers the data sent by transmitter 110. The processing by the demodulator 160 and the RX data processor 170 can be complementary to the processing by modulator 130 and TX data processor 120, respectively, at the transmitter 110.

Controllers 140 and 180 direct operation at transmitter 110 and receiver 150, respectively. Memory units 142 and 182 provide storage for program codes and data used by controllers 140 and 180, respectively.

Figure 2:
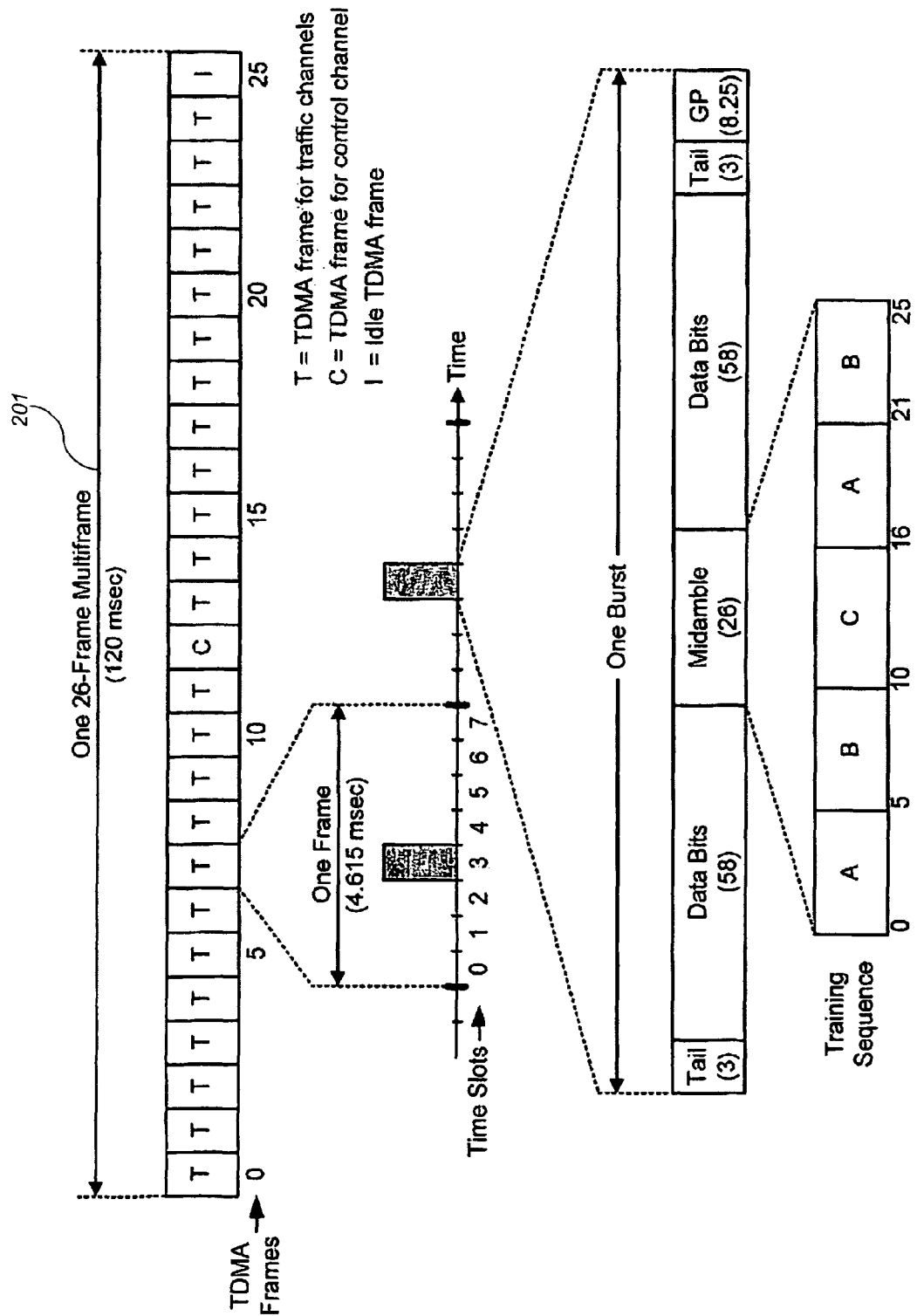
FIG. 2 is a diagram illustrating exemplary frame and burst formats in GSM in accordance with one aspect of the subject technology.

FIG. 2 shows exemplary frame and burst formats in GSM. The timeline for downlink transmission is divided into multiframes. For traffic channels used to send user-specific data, each multiframe, such as exemplary multiframe 201, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 2. A control channel, identified by the letter "C," is sent in TDMA frame 12. No data is sent in the idle TDMA frame 25 (identified by the letter "I"), which may be used by the wireless devices to make measurements for neighbor base stations.

Each TDMA frame, such as exemplary TDMA frame 202, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 203, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 204, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

One approach to locating a midamble in a burst of symbols serially compares hypotheses regarding the midamble position to determine which hypothesis provides the highest correlation energy between the known midamble sequence and the hypothesized position in the burst of symbols. This method is very sensitive to interference from multi-paths of the same midamble sequence, which can cause the correlation energy of inaccurate hypotheses to be affected by time-delayed copies thereof.

Figure 3:
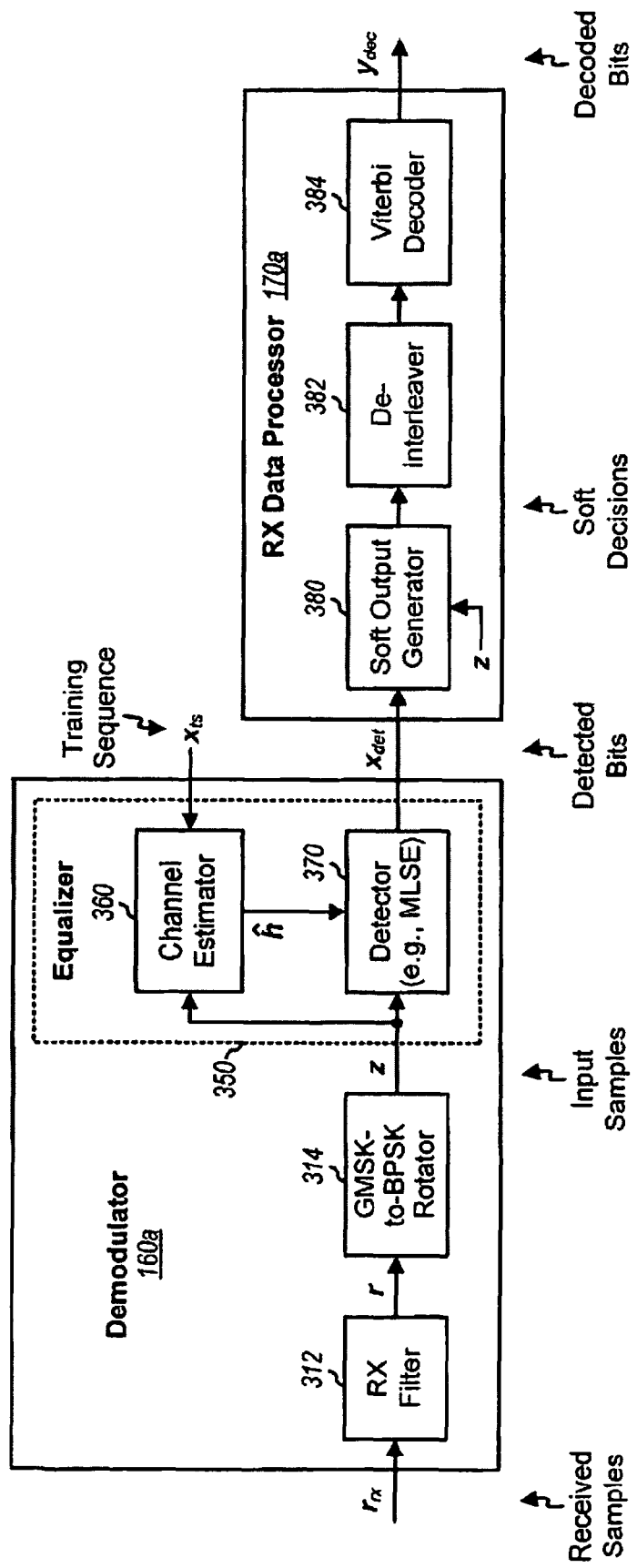
FIG. 3 is a block diagram of a receiver comprising a demodulator and a receive (RX) data processor for GSM.

FIG. 3 shows a demodulator 160a and an RX data processor 170a at the receiver 150 shown in FIG. 1. Within the demodulator 160a, an RX filter 312 filters the received samples $r_{rx}$ from receiver unit 154 and provides intermediate samples r.

A GMSK-to-BPSK rotator 314 performs phase rotation on the intermediate samples r and provides input samples z. For example, the rotator 314 can rotate the intermediate samples by successively more negative phases, or 0° for r(t), then −90° for r(t+1), then −180° for r(t+2), then −270° for r(t+3), then 0° for r(t+4), and so on.

An equalizer 350 performs equalization on the input samples z to remove intersymbol interference caused by multipath in the wireless channel. For the design shown in FIG. 3, the equalizer 350 includes a channel estimator 360 and a detector 370. The channel estimator 360 receives the input samples z and a training sequence $x_{ts}$ and derives an estimate of the effective channel impulse response $\hat{h}$.

The detector 370 receives the input samples z and the channel estimate $\hat{h}$ and performs detection to recover input bits a. The detector 370 may implement a maximum likelihood sequence estimator (MLSE) that determines a sequence of bits that is most likely to have been transmitted given the input sample sequence z and the channel estimate $\hat{h}$. The MLSE can use a Viterbi algorithm with $2^{L-1}$ states, where L is the length of the channel estimate $\hat{h}$. Detection with MLSE for GSM is well known in the art and not described in detail herein. The detector 370 provides detected bits $x_{det}$, which are hard decision estimates of the input bits a sent by the transmitter 110.

Within the RX data processor 170a, a soft output generator 380 receives the detected bits $x_{det}$ and the input samples z and generates soft decisions that indicate the confidence in the detected bits. The soft output generator 380 may implement an Ono algorithm that is well known in the art. A de-interleaver 382 de-interleaves the soft decisions in a manner complementary to the interleaving performed by the transmitter 110. A Viterbi decoder 384 decodes the deinterleaved soft decisions and provides decoded data $y_{dec}$, which is an estimate of the traffic data provided to the TX data processor 120 at the transmitter 110.

Figure 4:
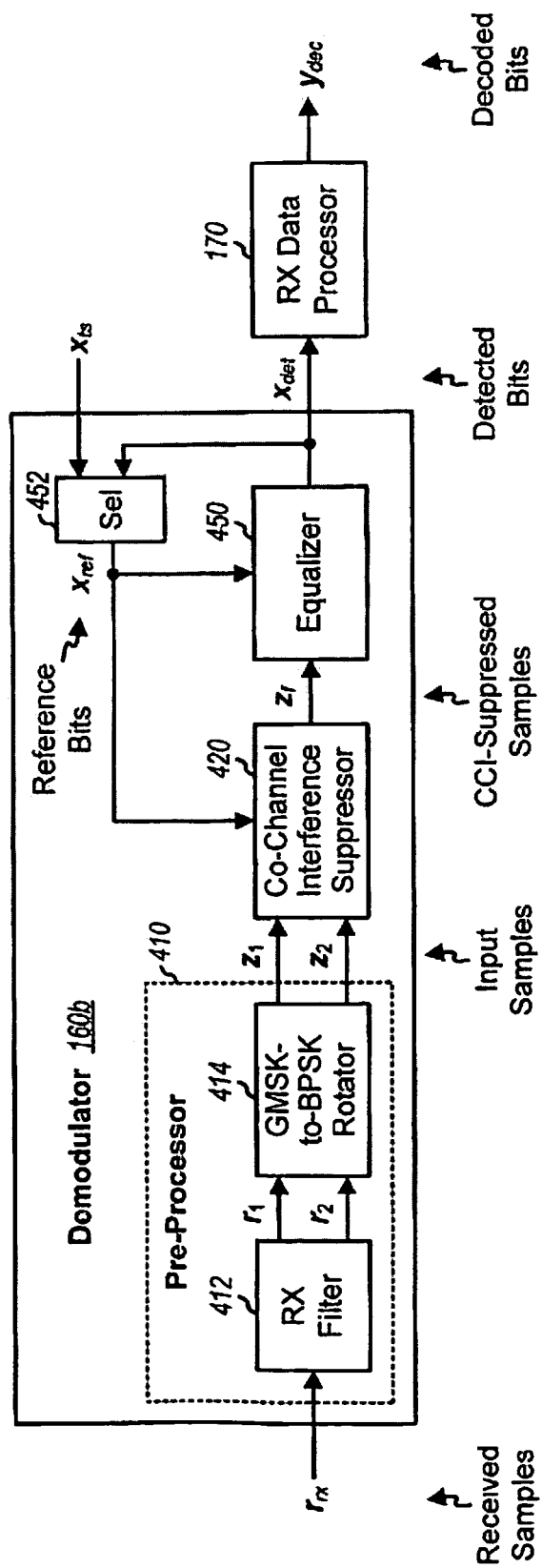
FIG. 4 is a block diagram of a receiver comprising a SAIC demodulator configured to perform detection with an interference suppression for use in a wireless communication system.

FIG. 4 is a block diagram of an exemplary single antenna interference cancellation (SAIC) demodulator 160b configured to perform detection with interference suppression for use in a wireless communication system. The receiver unit 154 (FIG. 1) may digitize the received GMSK signal at twice the sample rate and provide 2× oversampled received samples $r_{rx}$. Within a pre-processor 410, an RX filter 412 filters the received samples and provides a sequence of "early" samples $r_1$ and a sequence of "late" samples $r_2$. The RX filter 412 may be a poly-phase filter. A GMSK-to-BPSK rotator 414 performs phase rotation on each sequence of intermediate samples, $r_m$ for m=1, 2, and provides a corresponding sequence of input samples $Z_m$.

An interference suppressor 420 receives the two input sample sequences $z_1$ and $z_2$, suppresses co-channel interference from the undesired transmitter(s), and provides sequences of CCI-suppressed samples $z_{1f}$ and $z_{2f}$. An equalizer 450 performs equalization on the CCI-suppressed samples $z_{1f}$ and $z_{2f}$ to suppress intersymbol interference and provides detected bits $x_{det}$. The interference suppressor 420 and the equalizer 450 may be implemented in various manners, and several exemplary designs are described below.

The demodulator 160b may perform co-channel interference suppression and equalization for a single iteration or for multiple iterations to improve performance. Each iteration of the co-channel interference suppression and equalization is called an outer iteration. A selector (SEL) 452 receives the training sequence $x_{ts}$ and the detected bits $x_{det}$ and provides reference bits $x_{ref}$ for the interference suppressor 420 and the equalizer 450. In general, the selector 452 may provide the same reference bits to both the interference suppressor 420 and the equalizer 450 (as shown in FIG. 4) or different reference bits to the interference suppressor 420 and the equalizer 450 (not shown in FIG. 4).

Figure 5:
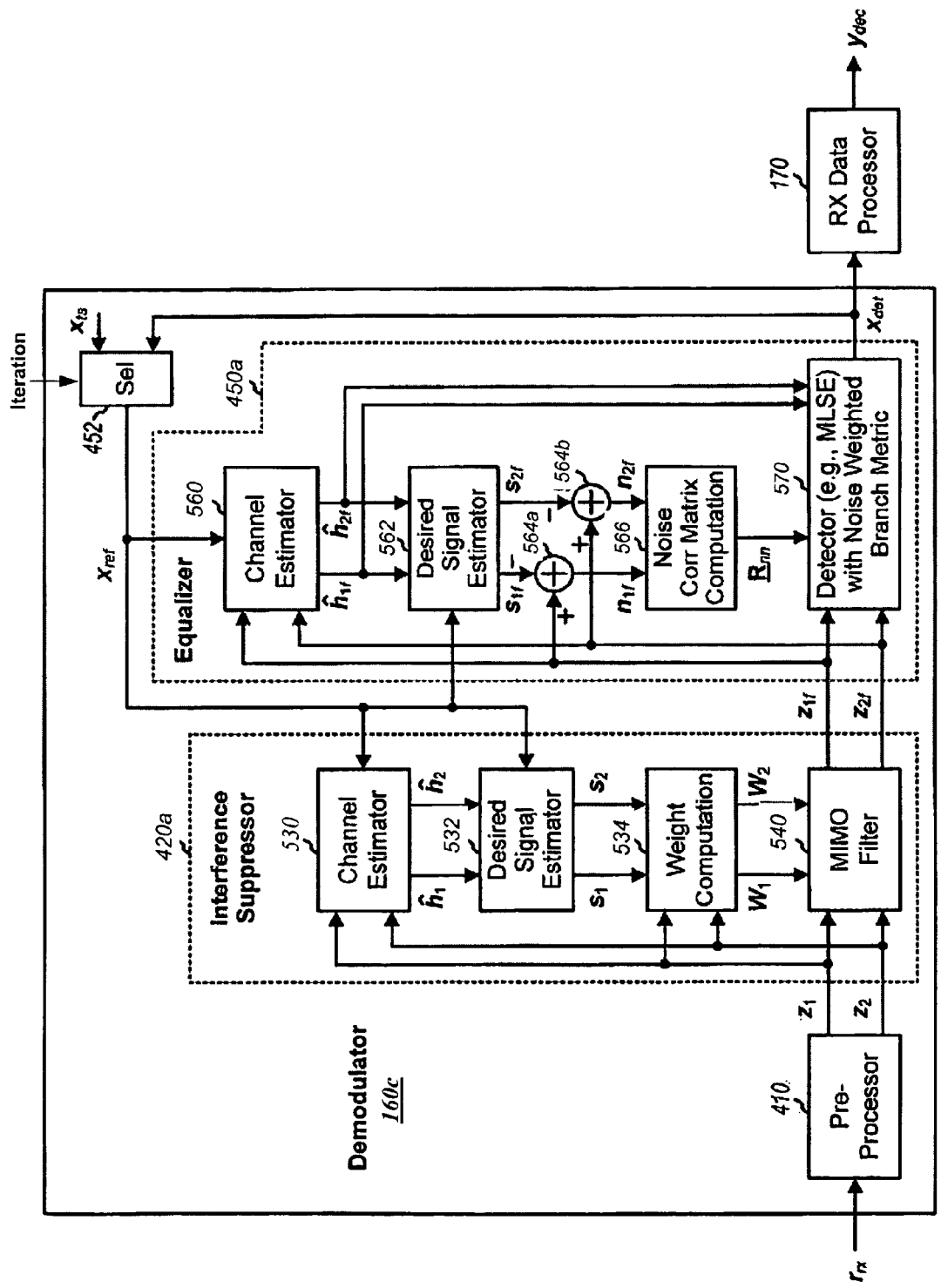
FIG. 5 is a block diagram of a receiver comprising a SAIC demodulator configured to perform detection with an interference suppression and noise decorrelation for use in a wireless communication system.

FIG. 5 is a block diagram of an exemplary SAIC demodulator 160c configured to perform detection with interference suppression and noise decorrelation for use in a wireless communication system. The exemplary SAIC demodulator 160c shown in FIG. 5, in addition to being configured to suppress co-channel interference, is also configured to perform detection with noise decorrelation. Within the demodulator 160c, a pre-processor 410 processes the received samples $z_{rx}$ and provides two sequences of complex-valued input samples $z_1$ and $z_2$. The demodulator 160c includes an interference suppressor 420a and an equalizer 450a.

The interference suppressor 420a is configured to suppress co-channel interference and provides two sequences of CCI-suppressed samples $z_{1f}$ and $z_{2f}$. The interference suppressor 420a includes a channel estimator 530, a desired signal estimator 532, a weight computation unit 534, and a multiple-in multiple-out (MIMO) filter 540. The channel estimator 530 may implement a least-squares (LS) estimator, a linear minimum mean square error (LMMSE), an adaptive filter, or some other type of estimator. The interference suppressor 420a may perform channel estimation and MIMO filtering for a single iteration or for multiple iterations to improve performance. The equalizer 450a includes a channel estimator 560, a desired signal estimator 562, a pair of summers 564a, 564b, a noise correlation matrix computation unit 566, and a detector 570 (e.g., an MLSE).

Operation of the exemplary SAIC demodulator 160c is now described. The following description is a summary of a more detailed description of operation of a SAIC demodulator provided in provided in U.S. patent application Ser. No. 11/122,654, titled "Interference Suppression With Virtual Antennas", which is incorporated herein by reference in its entirety. The channel estimator 530 receives one or more sequences of complex-valued input sample sequences (e.g., the first sequence $z_1$ and the second sequence $z_s$) from the pre-processor 410 and the reference bits $x_{ref}$ from the selector 452 and derives effective channel impulse response estimates (e.g., $\hat{h}_1$ for $z_1$ and $\hat{h}_2$ for $z_2$). The channel estimator 530 may implement a least-squares (LS) estimator, a linear minimum mean square error (LMMSE), an adaptive filter, or some other type of estimator. The desired signal estimator 532 receives the reference bits $x_{ref}$ and the effective channel response estimates $\hat{h}_1$ and $\hat{h}_2$ for the first and second sequences $z_1$ and $z_2$ and derives a desired signal estimate $s_1$ and $s_2$ based on $x_{ref}$ and $\hat{h}_1$ and $\hat{h}_2$. The weight computation unit 534 receives the input sample sequences $z_1$ and $z_2$ and the desired signal estimates $s_1$ and $s_2$ generates weights $W_1$ and $W_2$ for the MIMO filter 540.

The MIMO filter 540 may include two separate filters which are referred to as first and second MIMO filters. The first MIMO filter filters the input sample sequences $z_1$ and $z_2$ with the weights $W_1$ and provides a first CCI-suppressed sample sequence $z_{1f}$. The second MIMO filter filters the input sample sequences $z_1$ and $z_2$ with the weights $W_2$ and provides a second CCI-suppressed sample sequence $z_{2f}$. The first and second MIMO filters operate independently of one another. The weight computation unit 534 derives the weights $W_1$ such that the mean square error between the CCI-suppressed samples $z_{1f}$ and the desired signal estimate $s_1$ is minimized. The weight computation unit 534 derives the weights $W_2$ such that the mean square error between the CCI-suppressed samples $z_{2f}$ and the desired signal estimate $s_2$ is minimized.

Turning now to the equalizer 450a, the channel estimator 560 receives the two CCI-suppressed sample sequences $z_{1f}$ and $z_{2f}$ provided by the interference suppressor 420a and the reference bits $x_{ref}$ provided by the selector 452 and derives improved effective channel impulse response estimates $\hat{h}_{1f}$ and $\hat{h}_{2f}$ for sequences $z_{1f}$ and $z_{2f}$, respectively. In one aspect, the selector 452 provides a training sequence $(x_{ts})$, (e.g., the midamble 204 shown in FIG. 2) on a first iteration (e.g., It. 0) and a combination of the hard decision (e.g., $x_{det}$) and the training sequence on a subsequent iteration (e.g., It. 1). In one embodiment, the combination is represented by: $x_{ref}=[x_{det}(1) x_{det}(2) \ldots x_{det}(58) x_{ts}(1) x_{ts}(2) \ldots x_{ts}(26) x_{det}(59) x_{det}(60) \ldots x_{det}(116)]$. That is, the reference bits are arranged in temporal order, with the training sequence in the middle. The channel estimates $\hat{h}_{1f}$ and $\hat{h}_{2f}$ are typically of higher quality than the channel estimates $\hat{h}_1$ and $\hat{h}_2$ because co-channel interference has been suppressed in the sequences $z_{1f}$ and $z_{2f}$ used to derive the channel estimates $\hat{h}_{1f}$ and $\hat{h}_{2f}$.

The desired signal estimator 562 receives the reference bits $x_{ref}$ and the improved channel estimates $\hat{h}_{1f}$ and $\hat{h}_{2f}$, derives a desired signal estimate $s_{1f}$ based on $x_{ref}$ and $\hat{h}_{1f}$, derives a desired signal estimate $s_{2f}$ based on $x_{ref}$ and $\hat{h}_{2f}$, and provides the two desired signal estimates $s_{1f}$ and $s_{2f}$. The desired signal estimates $s_{1f}$ and $s_{1f}$ are typically of higher quality than the desired signal estimates $\hat{s}_1$ and $s_1$ because of the improved channel estimates $\hat{h}_{1f}$ and $\hat{h}_{2f}$ used to derive the desired signal estimates $s_{1f}$ and $s_{2f}$.

The summer 564a subtracts the desired signal estimate $s_{1f}$ from the CCI-suppressed samples $z_{1f}$ and provides a noise estimate $n_{1f}$. The summer 564b subtracts the desired signal estimate $s_{2f}$ from the CCI-suppressed samples $z_{2f}$ and provides a noise estimate $n_{2f}$. The computation unit 566 computes a 4×4 noise correlation matrix $\underline{R}_{nn}$ based on the real and imaginary parts of the noise samples in $n_{1f}$ and $n_{2f}$.

The detector 570 receives the CCI-suppressed sample sequences $z_{1f}$ and $z_{2f}$, the improved channel estimates $\hat{h}_{1f}$ and $\hat{h}_{2f}$, and the noise correlation matrix $\underline{R}_{nn}$. The detector 570 can perform detection based on the inputs and provides the detected bits $x_{det}$ that are deemed most likely to have been transmitted based on the branch metrics. In certain embodiment, the detector 570 is implemented with an MLSE. In other embodiments, the detector 570 may be implemented with other types of equalizers such as a decision feedback equalizer (DFE).

For the exemplary receiver shown in FIG. 5, a new channel estimate and a new desired signal estimate are derived for each outer iteration. In general, new or prior channel estimates may be used for each inner and outer iteration, and new or prior desired signal estimates may be used for each inner and outer iteration. For example, the channel estimates $\hat{h}_1$ and $\hat{h}_2$ may be derived once based on the training sequence and used for all outer iterations.

Figure 6:
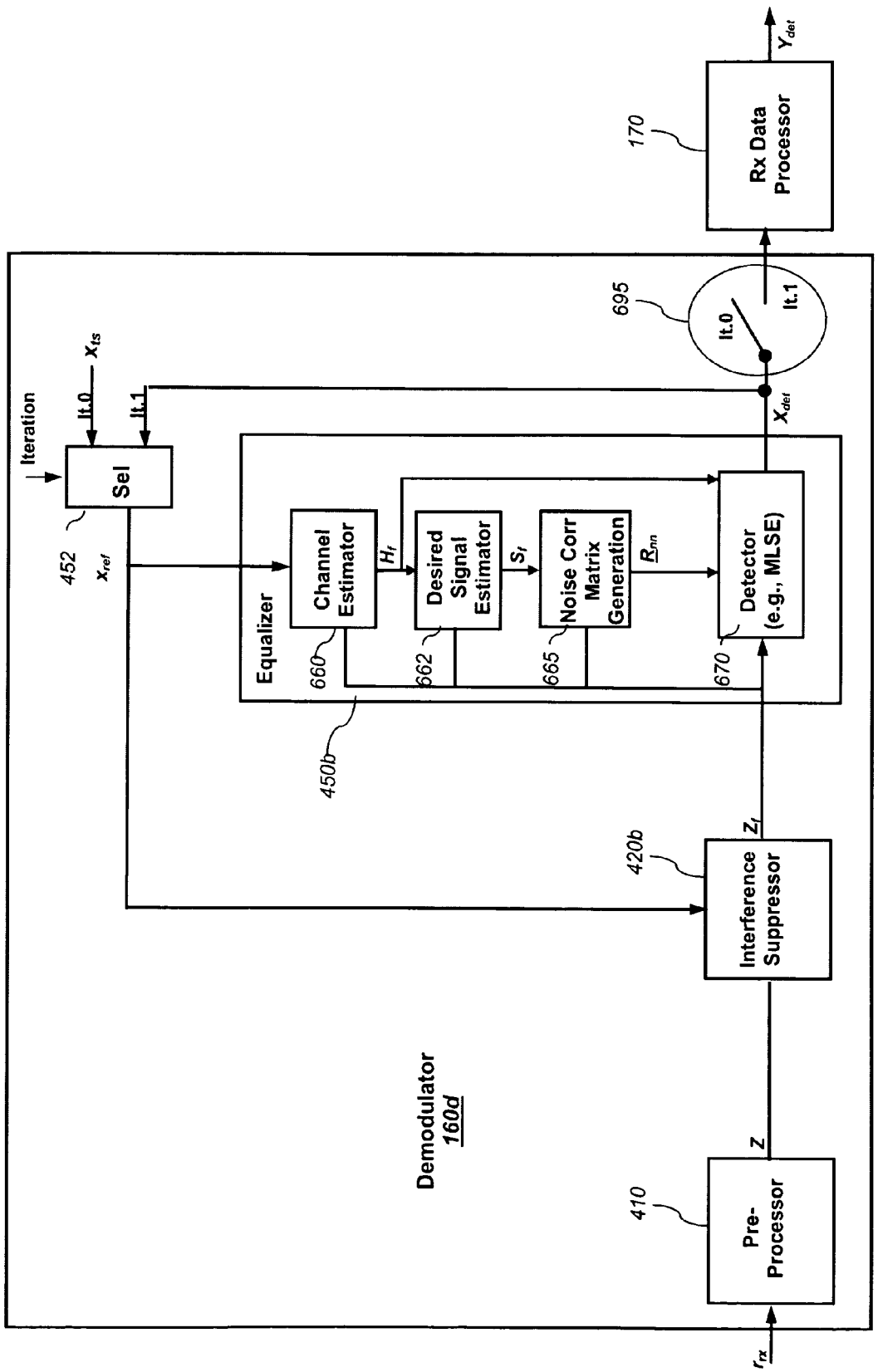
FIG. 6 is a block diagram of a receiver comprising a SAIC demodulator that is substantially similar to the receiver shown in FIG. 5.

FIG. 6 is a block diagram of an exemplary SAIC demodulator 160d that is substantially similar to the SAIC demodulator 160c of FIG. 5. The SAIC demodulator 160d is shown to include a pre-processor 410, an interference suppressor 420b, an equalizer 450b, a selector 452, and a switch 695. The SAIC demodulator 160d illustrated in FIG. 6 is substantially similar to the SAIC demodulator 160c illustrated in FIG. 5, except that the constituent components (e.g., a channel estimator, a desired signal estimator, a weight computation unit, and a MIMO filter) of the interference suppressor 420b are not shown; and some constituent components of the equalizer 450b are regrouped for simplicity and ease of illustration. For example, the equalizer 450b of FIG. 6 is shown to include a channel estimator 660, a desired signal generator 662, a noise correlation matrix generation module 665, and a detector 670. The noise correlation matrix generation module 665 can include a pair of summers and a noise correlation matrix computation unit such as the elements 564a, 564b, 566 shown in FIG. 5. The switch 695 is included in FIG. 6 to indicate that the detection processing is not conclusive after the first iteration, and that only after the second iteration, the detected bits move forward to the RX data processor 170. For example, in an embodiment in which no actual physical switch is used, a software subroutine associated with the detection processing does not make data representative of the detected bits to another subroutine associated with the RX data processing until after the second iteration is completed.

Additionally, it shall be appreciated that symbols such as Z, $Z_f$, H, and S can include one or more data sequences. For example, a single line connecting the pre-processor 410 and the interference suppressor 420b can indicate a single line carrying a single sequence of input samples (e.g., $z_1$) or multiple (e.g., two) lines carrying multiple sequences of input samples (e.g., $z_1$ and $z_2$). Similarly, $Z_f$ can denote $z_{1f}$ or $z_{1f}$ and $z_{2f}$, $H_f$ can denote $\hat{h}_{1f}$ or $\hat{h}_{1f}$ and $\hat{h}_{2f}$, and $S_f$ can denote $s_{1f}$ or $s_{1f}$ and $s_{2f}$.

Operation of the SAIC demodulator 160d is substantially the same as the operation of the SAIC demodulator 160c described above with respect to FIG. 5. An interference suppressor 420b suppresses interference (e.g., co-channel interference) using a training sequence ($x_{ts}$), (e.g., a midamble portion of the burst) on a first iteration (e.g., It. 0) and a hard decision (e.g., $x_{det}$) from a detector (e.g., MLSE) on a subsequent iteration (e.g., It. 1). Under a fair signal-to-noise ratio (SNR) condition (e.g., while the signal strength is substantially equal to or greater than the background white noise), a SAIC demodulator such as the one illustrated by FIGS. 5 and 6 offers advantages over a non-SAIC demodulator such as the one illustrated by FIG. 3 However, under a poor SNR condition (e.g., while the signal strength is sufficiently less than the background white noise), the SAIC demodulator becomes ineffective as compared to the non-SAIC demodulation scheme because midamble length is not sufficient for training and does not provide sufficient noise smoothening. Therefore, under a poor SNR condition, the non-SAIC demodulation receiver (e.g., without the co-channel interference suppression and the noise correlation matrix provided by the elements 420b, 661, and 665) can provide a better detection performance than the SAIC demodulation receiver.

Figure 7:
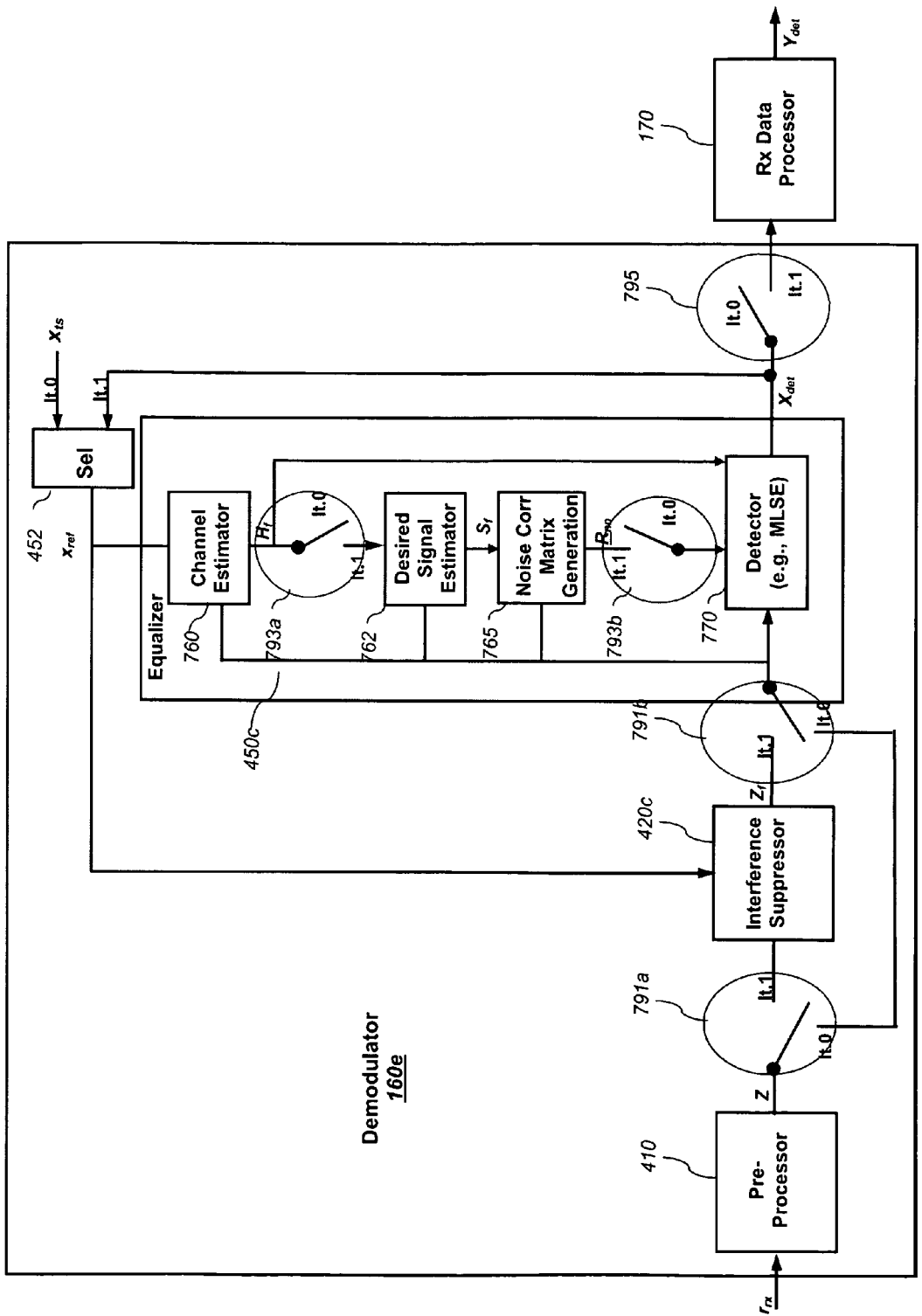
FIG. 7 is a block diagram illustrating a receiver comprising an exemplary hybrid SAIC demodulator in accordance with one aspect of the subject technology.

For improved detection performance, a hybrid SAIC demodulator is implemented wherein the demodulator is configured as a non-SAIC demodulator such as the one shown in FIG. 3 on a first iteration (e.g., It. 0) and as a SAIC demodulator such as the one shown in FIGS. 5 and 6 on a subsequent iteration (e.g., It. 1) under a poor SNR condition. FIG. 7 is a block diagram illustrating a receiver comprising an exemplary hybrid SAIC demodulator 160e in accordance with one aspect of the subject technology. The architecture of the hybrid demodulator 160e is substantially similar to the architecture of the SAIC demodulator 160d illustrated in FIG. 6, with the key differences being that the hybrid SAIC demodulator 160e additionally includes: a pair of bypass switches 791a,b configured to bypass or skip an interference suppressor 420c; and a pair of bypass switches 793a,b configured to bypass or skip a desired signal generator 762 and a noise matrix generation module 765 within the equalizer 450c. It shall be appreciated by one skilled in the art in view of the present disclosure that the switches 791a,b, 793a,b, and 795 shown in FIG. 7 can be implemented by hardware, software, or firmware.

In a first configuration corresponding to the first iteration (It. 0), the pairs of bypass switches 791a,b and 793a,b are in first positions such that: 1) the co-channel interference suppressor 420c is bypassed or skipped, and sequences of input samples (e.g., $z_1$ and $z_2$) flow from the pre-processor 410 to the detector (e.g., MLSE); and 2) the desired signal estimator 762 and the noise correlation matrix generation module 765 are bypassed or skipped. The channel estimator 760 receives a first set of reference bits ($x_{ref}$) comprising a training sequence ($x_{ts}$) and derives a first set of one or more channel estimates (e.g., $\hat{h}_{1f}$ and $\hat{h}_{2f}$). The detector 770 performs detection on Z, the sequences of input samples (e.g., $z_1$ and $z_2$), with $H_f$, the set of one or more channel estimates, to provide a set of detected bits ($x_{det}$). In this configuration, the hybrid SAIC demodulator 160e behaves substantially like a non-SAIC demodulator, such as the demodulator 160a illustrated in FIG. 3.

In a second configuration corresponding to a second iteration (It. 1), for example, the pairs of bypass switches 791a,b and 793a,b are in second positions such that the hybrid demodulator 160e is configured as, and behaves like, a SAIC demodulator, such as the SAIC demodulator 160d illustrated in FIG. 6. The co-channel interference suppressor 420c performs interference suppression on Z, the sequences of input samples (e.g., $z_1$ and $z_2$), using a second set of reference bits comprising the detected bits ($x_{det}$) obtained from the first iteration described above to provide $Z_f$, a set of suppressed samples (e.g., $z_{1f}$ and $z_{2f}$). Within the equalizer 450c, the channel estimator 760 receives a second set of reference bits comprising the detected bits ($x_{det}$) obtained from the first iteration described above and derives a second set of one or more channel estimates (e.g., $\hat{h}_{1f}$ and $\hat{h}_{2f}$). A desired signal estimator 762 receives the second set of one or more channel estimates and derives $S_f$, a set of one or more desired signal estimates (e.g., $s_{1f}$ and $s_{2f}$). A noise correlation matrix generation module 765 receives the set of one or more desired signal estimates and computes $\underline{R}_{nn}$, a noise correlation matrix. The detector 770 performs detection on Z, the sequences of input samples (e.g., $z_1$ and $z_2$) with $H_f$, the set of one or more channel estimates, to provide a set of detected bits ($x_{det}$).

In one aspect, the hybrid SAIC demodulator 160e can be configured as a non-SAIC demodulator (e.g., the demodulator 160a of FIG. 3) on a first iteration and a SAIC demodulators (e.g., the demodulator 160d of FIG. 6) on a subsequent iteration as described above under a poor SNR condition, e.g., when the background white noise is dominant as compared to a signal strength. When the SNR condition improves (e.g., the signal strength is dominant as compared to the white noise), the hybrid demodulator 160e can be configured as a SAIC demodulator (e.g., the demodulator 160d) on all iteration levels including the first iteration.

Figure 8:
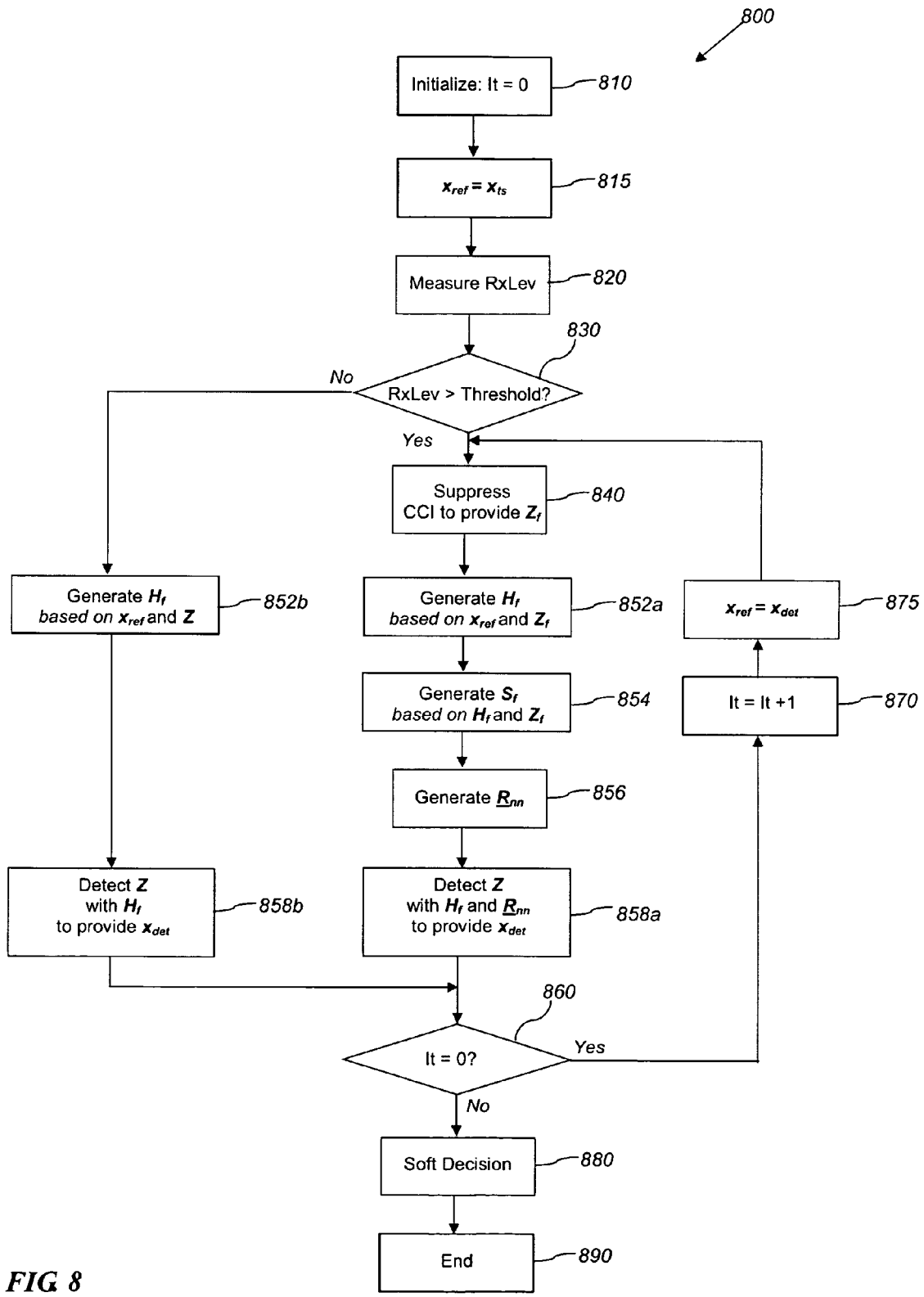
FIG. 8 is a flow diagram illustrating an exemplary process 800 for operation of a hybrid demodulator in accordance with one aspect of the subject technology.

FIG. 8 is a flow diagram illustrating an exemplary process 800 for operation of a hybrid demodulator in accordance with one aspect of the subject technology. For clarity, the process 800 is described with references to labeled components of the hybrid SAIC demodulator 160e as shown in FIG. 7. However, one skilled in the art would understand in view of the present disclosure that the methodology of the process 800 is not so limited and is applicable to different SAIC demodulator configurations known in the art. The process 800 begins at a state 800, in which an iteration variable (It) is initialized to 0. The process 800 proceeds to a state 815, in which the reference bits ($x_{ref}$) are assigned to a training sequence ($x_{ts}$), e.g., by the selector 452, to provide a first set of reference bits comprising the training sequence. The process 800 proceeds to a state 820, in which a received signal strength or level (RxLev) is measured. By way of example, RxLev, given by $$\frac{1}{G} \Box \frac{1}{N},$$

can be computed as follows: The received samples are squared and added to compute the signal energy at the equalizer input. Division by N gives the signal power at the input of the equalizer. The power is divided by the gain G of the receiver chain to translate it into the received power at the antenna. The process 800 proceeds to a decision state 830, in which a query is made as to whether the measured RxLev is larger than a threshold level.

The threshold level can be determined at the product design stage for the receiver based on various factors including an experimentally or theoretically determined background white noise level inherent to the receiver design. For example, suppose that the background white noise level is −100 dbm for a particular receiver design. Subsequently, a determination can be made as to at what signal power level below the background white noise level (e.g., −100 dbm) the performance advantage of the SAIC detection is lost and the non-SAIC detection is favorable to the SAIC detection. This determination can be made experimentally or theoretically. For example, if is determined that the performance advantage of the SAIC detection as compared to the non-SAIC detection is lost at 5 dbm below the background white noise level of −100 dbm, the threshold is set at −95 dbm.

RxLev>Threshold

Returning to the process 800 (FIG. 8), if the answer to the query at the decision state 830 is Yes (indicating, e.g., a fair SNR condition), the remainder of the operation 800 of the hybrid demodulator substantially tracks that of a SAIC demodulator, such as the demodulator 160d of FIG. 6. For example, the process 800 proceeds to a state 840, in which co-channel interference in a plurality of input samples (Z) is suppressed, e.g., by the interference suppressor 420c, to provide a set of suppressed samples ($Z_f$) based on the first set of reference bits assigned at the state 815. The process 800 proceeds to a state 852a, in which a set of one or more channel estimates ($H_f$) is derived, e.g., by the channel estimator 760, based on the first set of reference bits comprising the training sequence assigned at the state 815 and the set of suppressed samples provided at the state 840. The process 800 proceeds to a state 854, in which a set of one or more desired signal estimates ($S_f$) is derived, e.g., by the desired signal estimator 762, based on the set of suppressed samples provided at the state 840 and the set of one or more channel estimates derived at the state 852a. The process 800 proceeds to a state 854, in which a noise correlation matrix ($\underline{R}_{nn}$) is computed, e.g., by the noise correlation matrix generation module 765, based on the set of suppressed samples provided at the state 840 and the set of one or more desired signal estimates derived at the state 854. The process 800 proceeds to a state 858a, in which the detector 770 detects the set of suppressed samples based on the set of one or more channel estimates derived at the state 852a to provide a first set of detected bits.

The process 800 then proceeds to a decision state 860, in which a query is made as to whether the iteration variable (It) is 0. At this stage, the query condition is satisfied because It=0, and the process 800 proceeds to a state 870, where the iteration variable (It) is incremented from 0 to 1. The process 800 begins its second iteration (It=0) stage by proceeding to a state 875, in which the reference bits ($x_{ref}$) are assigned to the first set of detected bits obtained on the first iteration at the state 858a to provide a second set of reference bits comprising the first set of detected bits. The process 800 then loops back to the state 840, and the steps 840-858a described above are repeated, with a notable difference this time being that: 1) a second set of channel estimates ($H_f$) is derived based on the second set of reference bits comprising the first set of detected bits obtained on the first iteration (It=0) as opposed to the first set of reference bits comprising the training sequence; and 2) a second set of detected bits is obtained at the state 858a based on the second set of channel estimates. After the second set of detected bits is obtained, the process proceeds to the decision state 860 again. This time, the query condition (It=0?) is no longer satisfied, and the process 800 ends the demodulation and proceeds to a state 880, in which a soft decision is peformed on the second set of detected bits, e.g., by the Rx data processor 170 to provide $y_{det}$. The process 800 ends at state 890.

RxLev≤Threshold

On the other hand, if the answer to the query at the decision state 830 is No (indicating, e.g., a poor SNR condition), the operation of the hybrid demodulator takes on its "hybrid" nature. For example, on a first iteration (e.g., It=0), the operation of the hybrid demodulator substantially tracks that of a non-SAIC demodulator, such as the demodulators 160a of FIG. 3; on a subsequent iteration (e.g., It=1), the operation substantially tracks that of a SAIC demodulator such as the demodulator 160d of FIG. 6. As way of illustration, on the first iteration (It=0), the process 800 bypasses the co-channel interference suppression and proceeds to a state 852b, in which a set of one or more channel estimates ($H_f$) is derived, e.g., by the channel estimator 760, based on the first set of reference bits comprising the training sequence assigned at the state 815 and the plurality of input samples (as opposed to the set of suppressed samples if RxLev>Threshold). The process 800 bypasses the desired signal estimation and the noise correlation matrix generation and proceeds to a state 858b, in which the detector 770 detects the plurality of input samples (as opposed to the set of suppressed samples if RxLev>Threshold) based on the set of one or more channel estimates derived at the state 852b to provide a first set of detected bits.

The process 800 then proceeds to the decision state 860, in which a query is made as to whether the iteration variable (It) is 0. At this stage, the query condition is satisfied because It=0, and the process 800 proceeds to a state 870, where the iteration variable (It) is incremented from 0 to 1. The process 800 then begins its second iteration stage by proceeding to a state 875, in which the reference bits ($x_{ref}$) are assigned to the first set of detected bits obtained on the first iteration at the state 858b to provide a second set of reference bits comprising the first set of detected bits. The process 800 then proceeds to a state 840, in which co-channel interference in the plurality of input samples (Z) is suppressed, e.g., by the interference suppressor 420c, to provide a set of suppressed samples ($Z_f$) based on the second set of reference bits comprising the first set of detected bits obtained at the state 858b. The process 800 proceeds to a state 852a, in which a set of one or more channel estimates ($H_f$) is derived, e.g., by the channel estimator 760, based on the second set of reference bits comprising the first set of detected bits assigned at the state 875 and the set of suppressed samples provided at the state 840. The process 800 proceeds to a state 854, in which a set of one or more desired signal estimates ($S_f$) is derived, e.g., by the desired signal estimator 762, based on the set of suppressed samples provided at the state 840 and the set of one or more channel estimates derived at the state 852a. The process 800 proceeds to a state 854, in which a noise correlation matrix ($\underline{R}_{nn}$) is computed, e.g., by the noise correlation matrix generation module 765, based on the set of suppressed samples provided at the state 840 and the set of one or more desired signal estimates derived at the state 854. The process 800 proceeds to a state 858a, in which the detector 770 detects the set of suppressed samples based on the set of one or more channel estimates derived at the state 852a to provide a second set of detected bits.

After the second set of detected bits is obtained at the state 858a, the process proceeds to the decision state 860 again. This time, the query condition (It=0?) is no longer satisfied, and the process 800 ends the demodulation and proceeds to a state 880, in which a soft decision is peformed on the second set of detected bits, e.g., by the Rx data processor 170 to provide $y_{det}$. The process 800 ends at state 890.

It shall be appreciated that the process 800 described above is for illustration purpose only, and a multitude of variations can be made to the described process without departing from the scope of the present disclosure. For example, in one variation, instead of ending the demodulation after the second iteration, the demodulation steps of the states 840-858a can be repeated for additional $It_{ps}$−2 times, where $It_{ps}$ denotes a preset upper limit on the number of iterations, or until another pre-established condition is satisfied (e.g., when the SNR does not improve any further) before proceeding to the soft decision at the state 880. In another variation, the state 815 can be performed at any point between the state 820 and the state 840 or the state 852b. In yet another variation, the set of reference bits used for suppressing co-channel interference at the state 840 can be different from the set of reference bits used for generating the set of one or more channel estimates at the state 852a. In yet another variation, the hybrid demodulator may not generate the $\underline{R}_{nn}$ matrix to perform the noise decorrelation, in which case the states 854 and 856 may not be present.

Figure 9:
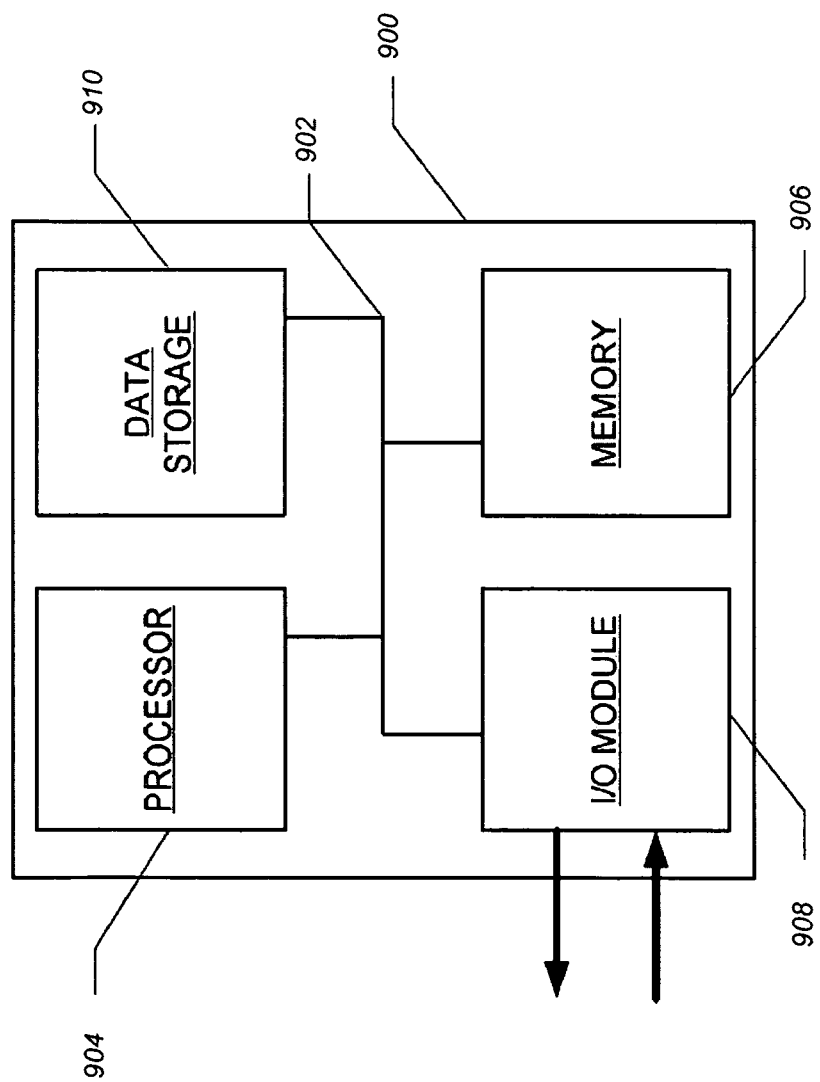
FIG. 9 is a block diagram illustrating a computer system with which certain aspects of the subject technology may be implemented.

FIG. 9 is a block diagram that illustrates a computer system 900 upon which an aspect may be implemented. Computer system 900 includes a bus 902 or other communication mechanism for communicating information, and a processor 904 coupled with bus 902 for processing information. Computer system 900 also includes a memory 906, such as a random access memory ("RAM") or other dynamic storage device, coupled to bus 902 for storing information and instructions to be executed by processor 904. Memory 906 may also be used for storing temporary variable or other intermediate information during execution of instructions to be executed by processor 904. Computer system 900 further includes a data storage device 910, such as a magnetic disk or optical disk, coupled to bus 902 for storing information and instructions.

Computer system 900 may be coupled via I/O module 908 to a display device (not illustrated), such as a cathode ray tube ("CRT") or liquid crystal display ("LCD") for displaying information to a computer user. An input device, such as, for example, a keyboard or a mouse may also be coupled to computer system 900 via I/O module 908 for communicating information and command selections to processor 904.

According to one aspect, various functions of a hybrid SAIC demodulator described herein are performed by a computer system 900 in response to processor 904 executing one or more sequences of one or more instructions contained in memory 906. Such instructions may be read into memory 906 from another machine-readable medium, such as data storage device 910. Execution of the sequences of instructions contained in main memory 906 causes processor 904 to perform the process steps described herein. One or more processors in a multi-processing arrangement may also be employed to execute the sequences of instructions contained in memory 906. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to processor 904 for execution. Such a medium may take many forms, including, but not limited to, non-volatile media, volatile media, and transmission media. Non-volatile media include, for example, optical or magnetic disks, such as data storage device 910. Volatile media include dynamic memory, such as memory 906. Transmission media include coaxial cables, copper wire, and fiber optics, including the wires that comprise bus 902. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver in a wireless communication system, comprising:
   an interference suppressor configured to suppress co-channel interference;
   an equalizer configured to suppress intersymbol interference; and
   a controller configured to:
   a) control the equalizer to suppress intersymbol interference in a plurality of input samples of a received signal and provide a first set of detected bits based on a first set of reference bits comprising a training sequence on a first iteration;
   b) control the interference suppressor to suppress co-channel interference in the plurality of input samples and provide a set of suppressed samples based on a second set of reference bits comprising the first set of detected bits on a second iteration; and
   c) control the equalizer to suppress intersymbol interference in the set of suppressed samples of b) and provide a second set of detected bits based on the second set of reference bits on the second iteration.

2. The receiver according to claim 1, wherein the controller is further configured to compare a strength of the received signal to a threshold prior to performing a)-c); and, if the strength of the received signal is greater than the threshold, skip a)-c) and alternatively:
   d) control the interference suppressor to suppress co-channel interference in the plurality of input samples to provide a first set of suppressed samples based on the first set of reference bits on a first alternative iteration; and
   e) control the equalizer to suppress intersymbol interference in the set of suppressed samples of d) to provide a set of detected bits based on the first set of reference bits on the first alternative iteration.

3. The receiver according to claim 2, wherein the controller is further configured to control the interference suppressor and the equalizer to perform one or more subsequent iterations of interference suppression and equalization, respectively, to improve performance.

4. The receiver according to claim 3, wherein the controller, on one of the one or more subsequent iterations, is further configured to:
   f) control the interference suppressor to suppress co-channel interference in a previous set of suppressed samples to provide a next set of suppressed samples based on a next set of reference bits comprising a set of detected bits obtained on a previous iteration, and
   g) control the equalizer to suppress intersymbol interference in the next set of suppressed samples of f) to provide a next set of detected bits based on the next set of reference bits.

5. The receiver according to claim 4, wherein the controller is further configured to repeat f)-g) for a plurality of iterations.

6. The receiver according to claim 1, wherein the interference suppressor comprises:
   a channel estimator configured to derive at least one channel estimate based on the plurality of input samples;
   a desired signal estimator configured to derive at least one desired signal estimate based on the at least one channel estimate,
   a weight computation unit configured to compute weights used to suppress co-channel interference; and
   a filter configured to filter the plurality of input samples with the weights to generate the set of suppressed samples.

7. The receiver according to claim 6, wherein the channel estimator is a least-squares (LS) estimator.

8. The receiver according to claim 6, wherein the filter is a multiple-input multiple-output (MIMO) filter.

9. The receiver according to claim 1, wherein the equalizer comprises:
   a channel estimator configured to derive a set of one or more channel estimates;
   a desired signal generator configured to derive a set of one or more desired signal estimates based on the set of one or more channel estimates;
   a noise correlation matrix generation module configured to compute a noise correlation matrix based on the set of one or more desired signal estimates; and
   a detector configured to perform detection on received samples.

10. The receiver according to claim 9, wherein the channel estimator is a least-squares (LS) estimator.

11. The receiver according to claim 9, wherein the detector is a maximum likelihood sequence estimator (MLSE).

12. The receiver according to claim 9, if the controller determines that a strength of the received signal is less than or equal to a threshold, the controller is configured to control the equalizer to:

perform the detection on the plurality of input samples with a first set of one or more channel estimates to provide the first set of detected bits on the first iteration, the first set of one or more channel estimates having been derived based on the plurality of input samples and the first set of reference bits; and perform the detection on the set of suppressed samples with a second set of one or more channel estimates and the noise correlation matrix to provide the second set of detected bits on the second iteration, the second set of one or more channel estimates having been derived based on the plurality of input samples and the second set of reference bits.

13. A method for processing input samples of a signal received in a wireless communication system, the method comprising:

a) equalizing a plurality of input samples to suppress intersymbol interference and provide a first set of detected bits based on a first set of reference bits comprising a training sequence on a first iteration;

b) suppressing co-channel interference in the plurality of input samples and provide a set of suppressed samples based on a second set of reference bits comprising the first set of detected bits on a second iteration; and c) equalizing the set of suppressed samples of the step b) to suppress intersymbol interference and provide a second set of detected bits based on the second set of reference bits on the second iteration.

14. The method according to claim 13, wherein the step a) comprises:

deriving a first set of one or more channel estimates based on the plurality of input samples and the first set of reference bits; and detecting the plurality of input samples based on the first set of one or more channel estimates.

15. The method according to claim 13, wherein the step c) comprises:

deriving a second set of one or more channel estimates based on the set of suppressed samples and the second set of reference bits;

deriving a set of one or more desired signal estimates based on the set of suppressed samples and the second set of one or more channel estimates;

computing a noise correlation matrix based on the set of suppressed samples and the set of one or more desired signal estimates; and detecting the plurality of input samples based the second set of one or more channel estimates and the noise correlation matrix.

16. The method according to claim 13, further comprising comparing a strength of the received signal to a threshold prior to the steps a)-c); and if the strength of the received signal is greater than the threshold, skipping the steps a)-c) and alternatively:

d) suppressing co-channel interference in the plurality of input samples to provide a set of suppressed samples based on the first set of reference bits on a first alternative iteration; and e) equalizing the set of suppressed samples of the step d) to provide a set of detected bits based on the first set of reference bits on the first alternative iteration.

17. The method according to claim 16, further comprising performing one or more subsequent iterations of interference suppression and equalization to improve performance.

18. The method according to claim 17, further comprising, on one of the one or more subsequent iterations:

f) suppressing co-channel interference in a previous set of suppressed samples to provide a next set of suppressed samples based on a next set of reference bits comprising a set of detected bits obtained on a previous iteration, and g) equalizing the next set of suppressed samples of the step f) to provide a next set of detected bits based on the next set of reference bits.

19. The method according to claim 18, wherein the steps f)-g) are repeated for a plurality of iterations.

20. The method according to claim 16, wherein the threshold is determined at a product design stage based at least in part on a background white noise level of the receiver.

21. A receiver comprising:

first interference suppressing means for suppressing co-channel interference;

second interference suppressing means for suppressing intersymbol interference; and controlling means for:

a) controlling the second interference suppressing means to suppress intersymbol interference in a plurality of input samples of a received signal and provide a first set of detected bits based on a first set of reference bits comprising a training sequence on a first iteration;

b) controlling the first interference suppressing means to suppress co-channel interference in the plurality of input samples and provide a set of suppressed samples based on a second set of reference bits comprising the first set of detected bits on a second iteration; and c) controlling the second interference suppressing means to suppress intersymbol interference in the set of suppressed samples of b) and provide a second set of detected bits based on the second set of reference bits on the second iteration.

22. A machine-readable non-transitory medium comprising instructions for processing input samples of a signal received in a wireless communication system, the instructions comprising code for:

a) equalizing a plurality of input samples to suppress intersymbol interference and provide a first set of detected bits based on a first set of reference bits comprising a training sequence on a first iteration;

b) suppressing co-channel interference in the plurality of input samples and provide a set of suppressed samples based on a second set of reference bits comprising the first set of detected bits on a second iteration; and c) equalizing the set of suppressed samples of the step b) to suppress intersymbol interference and provide a second set of detected bits based on the second set of reference bits on the second iteration.

\* \* \* \* \*